US006819479B1

(12) United States Patent
Islam et al.

(10) Patent No.: US 6,819,479 B1
(45) Date of Patent: Nov. 16, 2004

(54) OPTICAL AMPLIFICATION USING LAUNCHED SIGNAL POWERS SELECTED AS A FUNCTION OF A NOISE FIGURE

(75) Inventors: Mohammed N. Islam, Allen, TX (US); Michael J. Freeman, Northville, MI (US); Pavle Gavrilovic, Allen, TX (US); Andrzej Kaminski, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 104 days.

(21) Appl. No.: 10/028,576

(22) Filed: Dec. 20, 2001

(51) Int. Cl.[7] ............................................. H01S 3/00
(52) U.S. Cl. ................................. 359/337; 359/341.3
(58) Field of Search .......................... 359/337, 334, 359/341.3

(56) References Cited

U.S. PATENT DOCUMENTS

| 4,700,339 A | 10/1987 | Gordon et al. ................. 370/3 |
| 4,932,739 A | 6/1990 | Islam ..................... 350/96.15 |
| 4,995,690 A | 2/1991 | Islam ..................... 350/96.15 |
| 5,020,050 A | 5/1991 | Islam .......................... 370/4 |
| 5,060,302 A | 10/1991 | Grimes ...................... 359/135 |
| 5,078,464 A | 1/1992 | Islam ........................ 385/122 |
| 5,101,456 A | 3/1992 | Islam ......................... 385/27 |
| 5,115,488 A | 5/1992 | Islam et al. ................. 385/129 |
| 5,224,194 A | 6/1993 | Islam ........................ 385/122 |
| 5,225,922 A | 7/1993 | Chraplyvy et al. ......... 359/124 |
| 5,369,519 A | 11/1994 | Islam ........................ 359/173 |
| 5,485,536 A | 1/1996 | Islam ......................... 385/31 |
| 5,557,442 A | 9/1996 | Huber ........................ 359/179 |
| 5,623,508 A | 4/1997 | Grubb et al. .................. 372/3 |
| 5,664,036 A | 9/1997 | Islam ......................... 385/31 |
| 5,673,280 A | 9/1997 | Grubb et al. .................. 372/3 |
| 5,778,014 A | 7/1998 | Islam ........................... 372/6 |

(List continued on next page.)

FOREIGN PATENT DOCUMENTS

| EP | 0 829 980 A2 | 3/1998 | ........... H04J/14/02 |
| EP | 0 903 876 A1 | 3/1999 | ........... H04B/10/17 |
| EP | 0 911 926 A1 | 4/1999 | ............ H01S/3/10 |
| EP | 0 959 578 A2 | 11/1999 | ........... H04J/14/02 |
| EP | 1 054 489 A2 | 11/2000 | ........... H01S/3/067 |
| EP | 1 069 712 A2 | 1/2001 | ........... H04B/10/17 |
| EP | 0 903 876 B1 | 2/2001 | ........... H04B/10/17 |
| WO | 98/20587 | 5/1998 | ............ H01S/3/30 |
| WO | 98/36479 | 8/1998 | ............ H01S/3/10 |
| WO | 98/42088 | 9/1998 | ........... H04B/10/17 |
| WO | 99/43117 | 8/1999 | ........... H04J/14/00 |
| WO | 99/66607 | 11/1999 | |
| WO | 00/49721 | 8/2000 | |
| WO | 00/72479 | 11/2000 | ........... H04B/10/08 |
| WO | 00/73826 A2 | 12/2000 | ............ G02B/6/00 |

OTHER PUBLICATIONS

H. Masuda, et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, 3 pages, Jun. 1999.

H. Masuda, "Ultra Wide–Band Raman Amplification with a Total Gain–Bandwidth of 132 nm of Two Gain–Bands Around 1.5 $\mu$m," ECOC '99, Nice, France, 2 pages, Sep. 1999.

(List continued on next page.)

Primary Examiner—Mark Hellner
(74) Attorney, Agent, or Firm—Baker Botts L.L.P.

(57) ABSTRACT

In one embodiment, an optical amplifier includes a gain medium operable to receive a plurality of signals each having a center wavelength and a noise figure associated with at least a portion of the amplifier and varying as a function of wavelength. At least two of the plurality of signals have launch powers that are a function of a magnitude of the noise figure measured at or near the center wavelength of that signal.

133 Claims, 7 Drawing Sheets

U.S. PATENT DOCUMENTS

| | | | |
|---|---|---|---|
| 5,790,289 A | 8/1998 | Taga et al. | 359/124 |
| 5,796,909 A | 8/1998 | Islam | 385/147 |
| 5,801,860 A | 9/1998 | Yoneyama | 359/124 |
| 5,831,754 A | 11/1998 | Nakano | 359/161 |
| 5,847,862 A | 12/1998 | Chraplyvy et al. | 359/337 |
| 5,852,510 A | 12/1998 | Meli et al. | 359/341 |
| 5,861,981 A | 1/1999 | Jabr | 359/341 |
| 5,920,423 A | 7/1999 | Grubb et al. | 359/341 |
| 5,959,766 A | 9/1999 | Otterbach et al. | 359/337 |
| 5,995,275 A | 11/1999 | Sugaya | 359/341 |
| 6,008,933 A | 12/1999 | Grubb et al. | 359/341 |
| 6,040,933 A | 3/2000 | Khaleghi et al. | 359/124 |
| 6,043,927 A | 3/2000 | Islam | 359/332 |
| 6,049,413 A | 4/2000 | Taylor et al. | 359/337 |
| 6,052,393 A | 4/2000 | Islam | 372/6 |
| 6,055,092 A | 4/2000 | Sugaya et al. | 359/337 |
| 6,067,177 A | 5/2000 | Kanazawa | 359/124 |
| 6,072,601 A | 6/2000 | Toyohara | 358/484 |
| 6,088,152 A | 7/2000 | Berger et al. | 359/334 |
| 6,094,296 A | 7/2000 | Kosaka | 359/341 |
| 6,101,024 A | 8/2000 | Islam et al. | 359/334 |
| 6,104,848 A | 8/2000 | Toyohara et al. | 385/24 |
| 6,115,157 A | 9/2000 | Barnard et al. | 359/124 |
| 6,115,174 A | 9/2000 | Grubb et al. | 359/334 |
| 6,134,034 A | 10/2000 | Terahara | 359/124 |
| 6,147,794 A | 11/2000 | Stentz | 359/334 |
| 6,151,160 A | 11/2000 | Ma et al. | 359/341 |
| 6,172,803 B1 | 1/2001 | Masuda et al. | 359/341 |
| 6,185,022 B1 | 2/2001 | Harasawa | 359/124 |
| 6,219,162 B1 | 4/2001 | Barnard et al. | 359/124 |
| 6,229,937 B1 | 5/2001 | Nolan et al. | 385/24 |
| 6,239,902 B1 | 5/2001 | Islam et al. | 359/334 |
| 6,239,903 B1 | 5/2001 | Islam et al. | 359/337 |
| 6,271,945 B1 | 8/2001 | Terahara | 359/124 |
| 6,282,002 B1 | 8/2001 | Grubb et al. | 359/160 |
| 6,320,884 B1 | 11/2001 | Kerfoot, III et al. | 372/3 |
| 6,335,820 B1 | 1/2002 | Islam | 359/334 |
| 6,344,922 B1 | 2/2002 | Grubb et al. | 359/334 |
| 6,356,383 B1 | 3/2002 | Cornwell, Jr. et al. | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,384,963 B2 * | 5/2002 | Ackerman et al. | 359/334 |
| 6,388,801 B1 | 5/2002 | Sugaya et al. | 359/334 |
| 6,404,523 B1 | 6/2002 | Morikawa et al. | 359/124 |
| 6,417,959 B1 | 7/2002 | Bolshtyansky et al. | 359/334 |
| 6,501,593 B2 * | 12/2002 | Akasaka et al. | 359/341.31 |
| 6,624,927 B1 * | 9/2003 | Wong et al. | 359/334 |
| 2001/0014194 A1 | 8/2001 | Sasaoka et al. | 385/15 |
| 2001/0050802 A1 | 12/2001 | Namiki et al. | 359/337.11 |
| 2002/0048062 A1 | 4/2002 | Sakamoto et al. | 359/124 |
| 2002/0060821 A1 | 5/2002 | Manna et al. | 359/124 |

OTHER PUBLICATIONS

E.M. Dianov, "Raman fiber amplifiers," Fiber Optics Research Center at the General Physics Institute of the Russian Academy of Sciences, Moscow, Russia, 5 pages, © 1999.

A.K. Srivastava, et al., "System Margin Enhancement with Raman Gain in Multi–Span WDM Transmission," Technical Digest, OFC '99, 3 pages, Friday Feb. 26, 1999.

PCT, Written Opinion, International Preliminary Examining Authority, 6 pages, Mar. 10, 2003.

Chraplyvy et al., "Equalization in Amplified WDM Lightwave Transmission Systems," IEEE Photonics Technology Letters, vol. 4, No. 8, pp. 920–922, Aug. 1992.

Liaw et al., "Passive Gain–Equalized Wide–Band Erbium–Doped Fiber Amplifier Using Samarium–Doped Fiber," IEEE Photonics Technology Letters, vol. 8, No. 7, pp. 879–881, Jul. 1996.

White et al.; "Optical Fiber Components and Devices," Optical Fiber Telecommunications, Ch. 7, pp. 267–319, 1997.

Zyskind et al., "Erbium–Doped Fiber Amplifiers for Optical Communications," Optical Fiber Telecommunications, Ch. 2., pp. 13–69, 1997.

Agrawal, "Fiber–Optic Communication Systems," Second Edition, Basic Concepts, John Wiley & Sons, pp. 365–366 plus title page and copyright page, 1997.

Tonguz et al., "Gain Equalization of EDFA Cascades," Journal of Lightwave Technology, vol. 15, No. 10, pp. 1832–1841, Oct. 1997.

Masuda et al., "Ultrawide 75–nm 3–dB Gain–Band Optical Amplification with Erbium–Doped Fluoride Fiber Amplifiers and Distributed Raman Amplifiers," IEEE Photonics Technology Letters, vol. 10, No. 4, pp. 516–518, Apr. 1998.

Dianov et al., "High efficient 1.3$\mu$m Raman fiber amplifier," Electronics Letters, vol. 34, No. 7, pp. 669–670, Apr. 2, 1998.

Forghieri et al., "Simple Model of Optical Amplifier Chains to Evaluate Penalties in WDM Systems," Journal of Lightwave Technology, vol. 16, No. 9, pp. 1570–1576, Sep. 1998.

Chernikov et al., "Broadband Silica Fibre Raman Amplifiers at 1.3 $\mu$m and 1.5 $\mu$m ," ECOC, pp. 49–50, Sep. 20–24, 1998.

Letellier et al., "Access to Transmission Performance Margins Through Pre–emphasis Adjustment in WDM Systems," ECOC, pp. 275–276, Sep. 20–24, 1998.

Chernikov et al., "Broadband Raman amplifiers in the spectral range of 1480–1620 nm," OFC/IOOC Technical Digest, vol. 2, pp. 117–119, Feb. 21–26, 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Kawai et al. "Wide–Bandwidth and Long–Distance WDM Transmission Using Highly Gain–Flattened Hybrid Amplifier," IEEE Photonics Technology Letters, vol. 11, No. 7, pp. 886–888, Jul. 1999.

Lewis et al., "Gain and saturation characteristics of dual–wavelength–pumped silica fibre Raman amplifiers," Electronics Letters, vol. 35, No. 14, pp. 1178–1179, Jul. 8, 1999.

Suzuki et al., "50 GHz spaced, 32×10 Gbit/s dense WDM transmission in zero–dispersion region over 640 km of dispersion–shifted fibre with multiwavelength distributed Raman amplification," Electronics Letters, vol. 35, No. 14, pp. 1175–1176, Jul. 8, 1999.

Emori et al., "100nm bandwidth flat–gain Raman amplifiers pumped and gain–equalised by 12–wavelength–channel WDM laser diode unit," Electronics Letters, vol. 35, No. 16, pp. 1355–1356, Aug. 5, 1999.

Manna et al., "Modeling of Penalties on Chains of Optical Amplifiers with Equalizing Filters," Journal of Lightwave Technology, vol. 18, No. 3, pp. 295–300, Mar. 2000.

Fludger et al., "Fundamental Noise Limits in Broadband Raman Amplifiers," OFC, pp. MA5/1–MA5/3, 2001.

Seo et al., "Compensation of Raman–Induced Crosstalk Using a Lumped Germanosilicate Fiber Raman Amplifier in the 1.571–1.591–$\mu$m Region," IEEE Photonics Technology Letters, vol. 13, No. 1, pp. 28–30, Jan. 2001.

Seo et al., "Simultaneous Amplification and Channel Equalization Using Raman Amplifier for 30 Channels in 1.3–µm Band," Journal of Lightwave Technology, vol. 19, No. 3, pp. 391–397, Mar. 2001.

Chen et al., "Transient effects in saturated Raman amplifiers," Electronics Letters, vol. 37, No. 6, 2 pgs., Mar. 15, 2001.

Optical Society of America, Optical Amplifiers and Their Applications, Technical Digest, entitled "Raman amplification and dispersion–managed solitons for all–optical, ultra–long–haul, dense WDM.", Jul. 1–4, 2001.

Menif et al., "Applications of Preemphasis to Achieve Flat Output OSNR in Time–Varying Channels in Cascaded EDFAs Without Equalization," Journal of Lightwave Technology, vol. 19, No. 10, pp. 1440–1452, Oct. 2001.

Murakami et al., "WDM Upgrading of an Installed Submarine Optical Amplifier System," Journal of Lightwave Technology, vol. 19, No. 11, pp. 1665–1674, Nov. 2001.

Rottwitt et al., "A 92 nm Bandwidth Raman Amplifier," OSA Optical Fiber Conference, San Jose, CA, paper PD–6, pp. 1–4.

Emori et al., "Less than 4.7 dB Noise Figure Broadband In–line EDFA with A Raman Amplified–1300 ps/nm DCF Pumped by Multi–channel WDM Laser Diodes," paper PD3–1–5.

Masuda et al., "76–nm 3–dB gain–band hybrid fiber amplifier without gain–equalizer," (Submitted to Post–Deadline Paper OAA'98), pp. PD7–1—PD7–5.

Nissov et al., "100 Gb/s (10×10Gb/s) WDM Transmission Over 7200 km Using Distributed Raman Amplification," pp. 9–12.

Srivastava et al., "High–speed WDM Transmission in All-Wave™ Fiber in Both the 1.4–µm and 1.55–µm Bands," paper PD–2–5, Vail, CO.

Walker, "Status and Challenges of Optical Fiber Amplifiers and Lasers," paper MB–1–3, pp. 12–14.

Yariv, "Optical Electyronics in Modem Communications," Delection of Optical Radiation, Ch. 11, pp. 412–473.

Koch et al., "Broadband gain flattened Raman Amplifier to extend operation in the third telecommunication window," FF3–1–3, pp. 103–105.

Emori et al., "Cost–effective depolarized diode pump unit designed for C–band flat–gain Raman amplifiers to control EDFA gain profile," FF4–1–3, pp. 106–108.

Scheerer et al., "SRS crosstalk in preemphasized WDM Systems," pp. WM28–1/293–WM28–3/295.

Pending patent application, USSN 09/768,367, entitled "All Band Amplifier," by Mohammed N. Islam, Filed Jan. 22, 2001.

Pending patent application; USSN 10/100,591; entitled "System and Method for Managing System Margin," by Mohammed N. Islam et al, Filed Mar. 15, 2002.

Pending patent application; USSN 10/100,587; entitled "Fiber Optic Transmission System with Low Cost Transmitter Compensation," by Mohammed N. Islam, Filed Mar. 15, 2002.

Pending patent application; USSN 10/100,700; entitled "Rack System for an End Terminal in an Optical Communication Network," by Mohammed N. Islam et al, Filed Mar. 15, 2002.

Pending patent application; USSN 09/811,067, entitled "Method and System for Reducing Degradation of Optical Signal to Noise Ratio," by Michael W. Chbat et al, Filed Mar. 16, 2001.

Pending patent application; USSN 09/811,103; entitled "System and Method for Wide Band Raman Amplification," by Mohammed N. Islam et al, Filed Mar. 16, 2001.

Pending patent application; USSN 10/116,487; entitled "Fiber Optic Transmission System for a Metropolitan Area Network," by Mohammed N. Islam, Filed Apr. 3, 2002.

Pending patent application; USSN 10/211,209; entitled "Active Gain Equalization," by Mohammed N. Islam et al, Filed Aug. 2, 2002.

PCT International Search Report Form PCT/ISA/210, International Application No. PCT/US99/13551, Jan. 11, 2000.

* cited by examiner

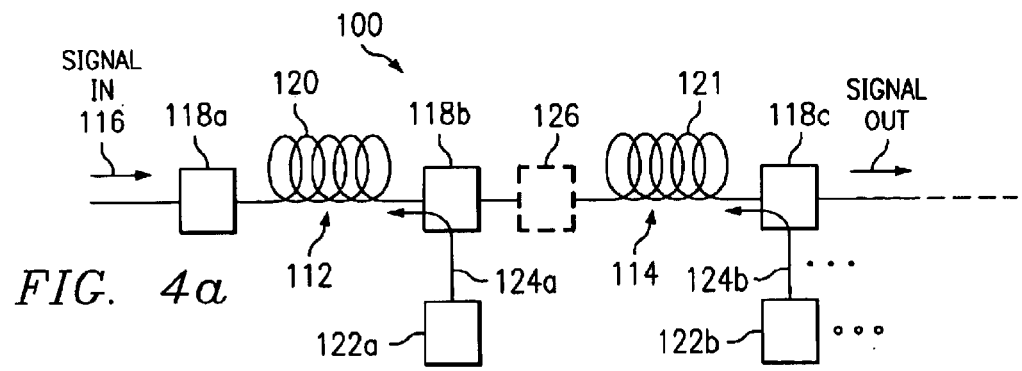
FIG. 4a
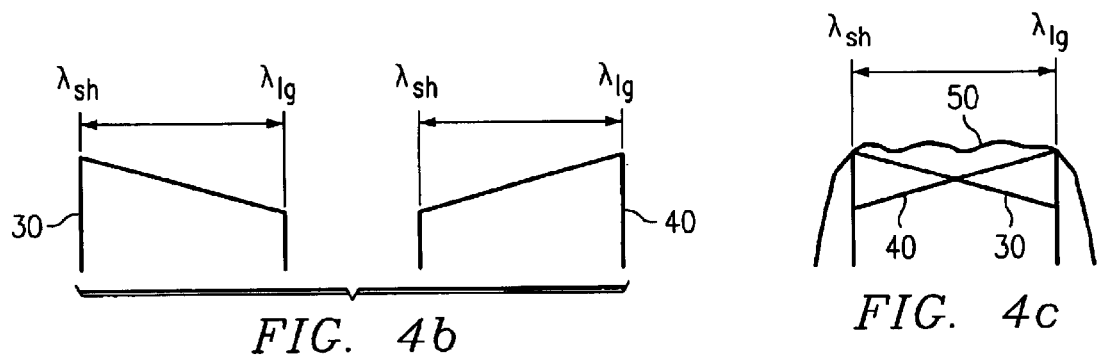
FIG. 4b
FIG. 4c
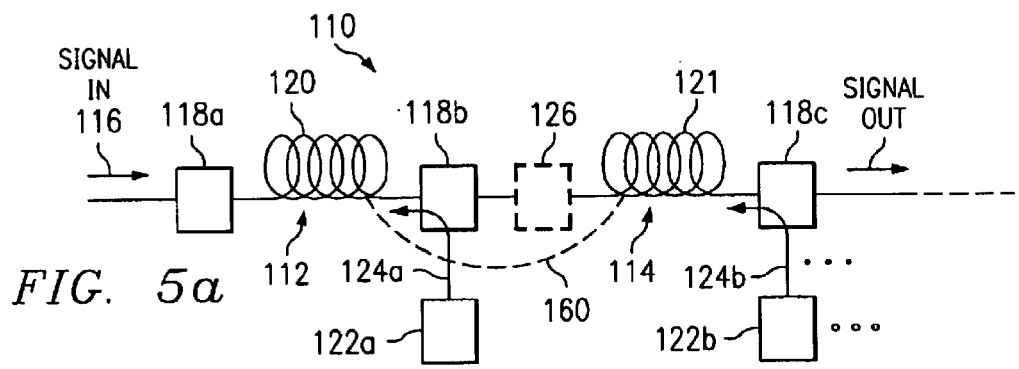
FIG. 5a
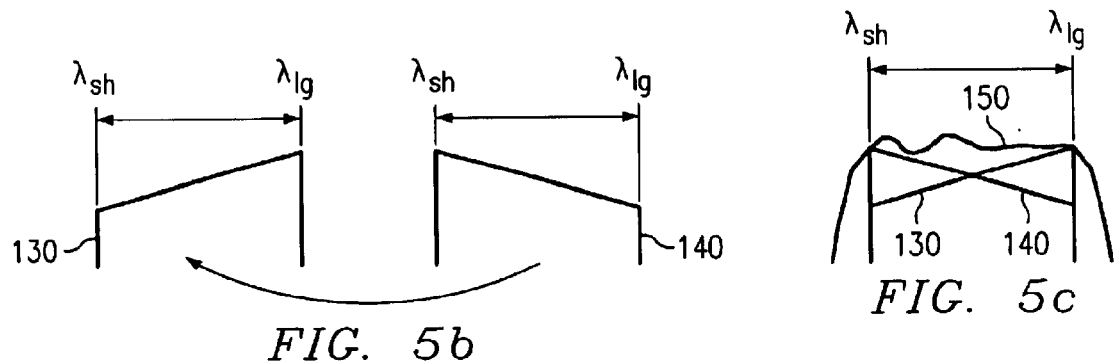
FIG. 5b
FIG. 5c

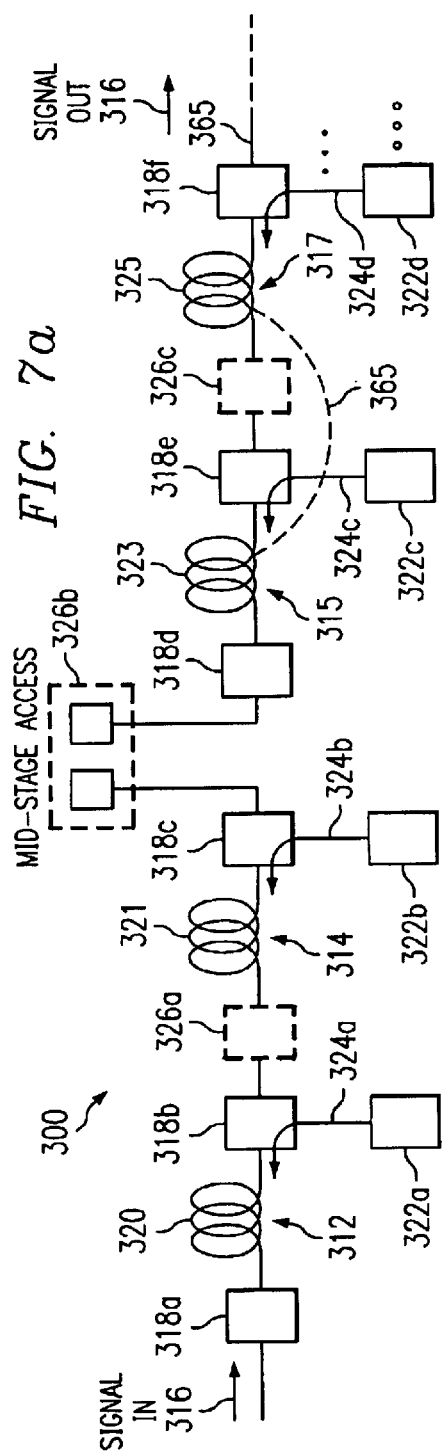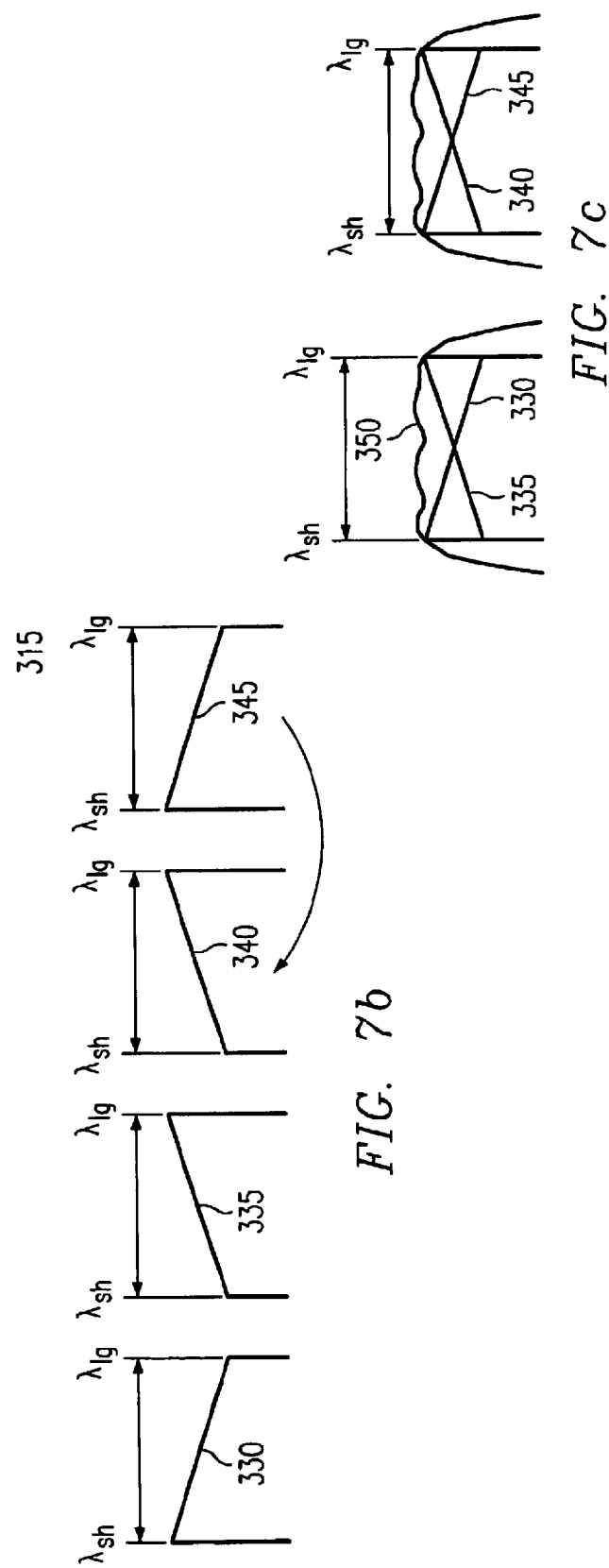
FIG. 7a
FIG. 7b
FIG. 7c

OPTICAL AMPLIFICATION USING LAUNCHED SIGNAL POWERS SELECTED AS A FUNCTION OF A NOISE FIGURE

TECHNICAL FIELD OF THE INVENTION

The present invention relates generally to communication systems, and more particularly to a system and method for providing optical amplification using input signals having launch powers that are a function of the noise figure of at least a portion of the system.

BACKGROUND

In designing a wavelength division multiplexed optical transmission link including multiple spans of fiber with optical amplifiers interposed between the spans, conventional design approaches assume that the noise figure for the system is spectrally flat and equal in magnitude to the worst case noise figure for the system. Designers calculate a desired signal to noise ratio (SNR) as a function of the number of spans in the system, and select a launch power for wavelength signals input to the system that ensures that all channels will achieve the desired SNR, even at wavelengths having the highest noise figure. Generally, designers apply the same launch power to all wavelength signals.

SUMMARY OF EXAMPLE EMBODIMENTS

The present invention recognizes a need for a more efficient optical communications system and method of communicating signals.

In one embodiment, an optical amplifier comprises a gain medium operable to receive a plurality of signals each comprising a center wavelength and a noise figure associated with at least a portion of the amplifier and varying as a function of wavelength. At least two of the plurality of signals comprise a launch power that is a function of a magnitude of the noise figure measured at or near the center wavelength of that signal.

In another embodiment an optical amplifier comprises an input operable to receive a plurality of signals each comprising a center wavelength, wherein at least two of the plurality of signals comprise different launch powers. The amplifier further comprises a pump operable to generate a pump signal and a gain medium operable to receive the plurality of signals and the pump signal and to facilitate amplification of at least some of the plurality of signals. The amplifier also comprises an output operable to communicate amplified versions of the plurality of signals. A signal to noise ratio measured at the output of the amplifier varies by no more than 2.5 decibels over a bandwidth of at least 40 nanometers for at least a majority of signals output from the amplifier.

In still another embodiment, an optical communication system comprises an input terminal comprising a plurality of optical transmitters each operable to output one of a plurality of signals each comprising a center wavelength. The system further comprises a plurality of spans of optical medium coupled to the input terminal and operable to facilitate communication of the plurality of signals and a plurality of in-line amplifiers each coupled to at least one of the plurality of spans of optical medium. At least some of the plurality of signals comprise a launch power that is a function of a noise figure associated with at least a portion of the system.

In a method embodiment, a method of communicating optical signals comprises communicating a plurality of signals each having a center wavelength to an optical link comprising a plurality of spans of fiber. The method further comprises amplifying the plurality of signals to at least partially compensate for losses in one or more of the plurality of spans of fiber. Signals output from the optical link experience a noise figure varying as a function of wavelength. At least two of the signals input to the optical link comprise a launch power that is a function of the noise figure measured at or near the center wavelength of that signal.

In another method embodiment, a method of communicating signals comprises adjusting launch powers of a plurality of signals input to an optical link based at least in part on a noise figure associated with at least a portion of the optical link. The method further comprises adjusting a pump power of an amplifier in the optical link to give a desired gain spectrum in light of the adjusted launch powers. The steps of adjusting the launch power and adjusting the pump power are repeated until a signal to noise ratio at an output from the optical link varies by no more than a threshold amount for at least a majority of signals output from the optical link.

Depending on the specific features implemented, particular embodiments may exhibit some, none, or all of the following technical advantages. One embodiment provides a mechanism for reducing the total launched signal power in an optical link. Reducing the launched signal power reduces the intensity of light on connectors and other components, increasing the reliability of the system. Additionally, reduced launched signal power allows for use of lower powered pumps in amplifiers within the system. Reducing the pump power required generally results in decreased system costs.

As an additional benefit this technique facilitates freedom in design of gain profiles in multiple stage amplifiers. Because signal launch power is selected to at least partially address the noise figure issue, gain profiles of the amplifiers can be selected with less regard to maintaining a particular noise figure shape or magnitude.

Although this technique applies to and benefits many amplifier types, at least the following additional advantages can be realized when applying this technique to systems using Raman amplification. For example, when implemented in a Raman amplification system, this technique results in reduced non-linear penalties, such as four-wave mixing and Brillouin) effect, which tend to be less prevalent at lower signal powers.

Other technical advantages of the present invention will be readily apparent to one skilled in the art from the following figures, description and claims.

BRIEF DESCRIPTION OF THE DRAWINGS

For a more complete understanding of the present invention, and for further features and advantages thereof, reference is now made to the following description taken in conjunction with the accompanying drawings, in which:

FIGS. 4a–4c illustrate an exemplary embodiment of a multiple stage amplifier including at least two amplification stages, gain profiles associated with various amplification stages of the amplifier, and an overall gain profile for the amplifier, respectively;

FIGS. 5a–5c illustrate another exemplary embodiment of a multiple stage amplifier including at least two amplification stages, gain profiles associated with various amplification stages of the amplifier, and an overall gain profile for the amplifier, respectively;

FIGS. 7a–7c illustrate another exemplary embodiment of a multiple stage amplifier including at least four amplification stages, gain profiles associated with various amplification stages of the amplifier, and an overall gain profile for the amplifier, respectively;

DETAILED DESCRIPTION OF EXAMPLE EMBODIMENTS

Figure 1:
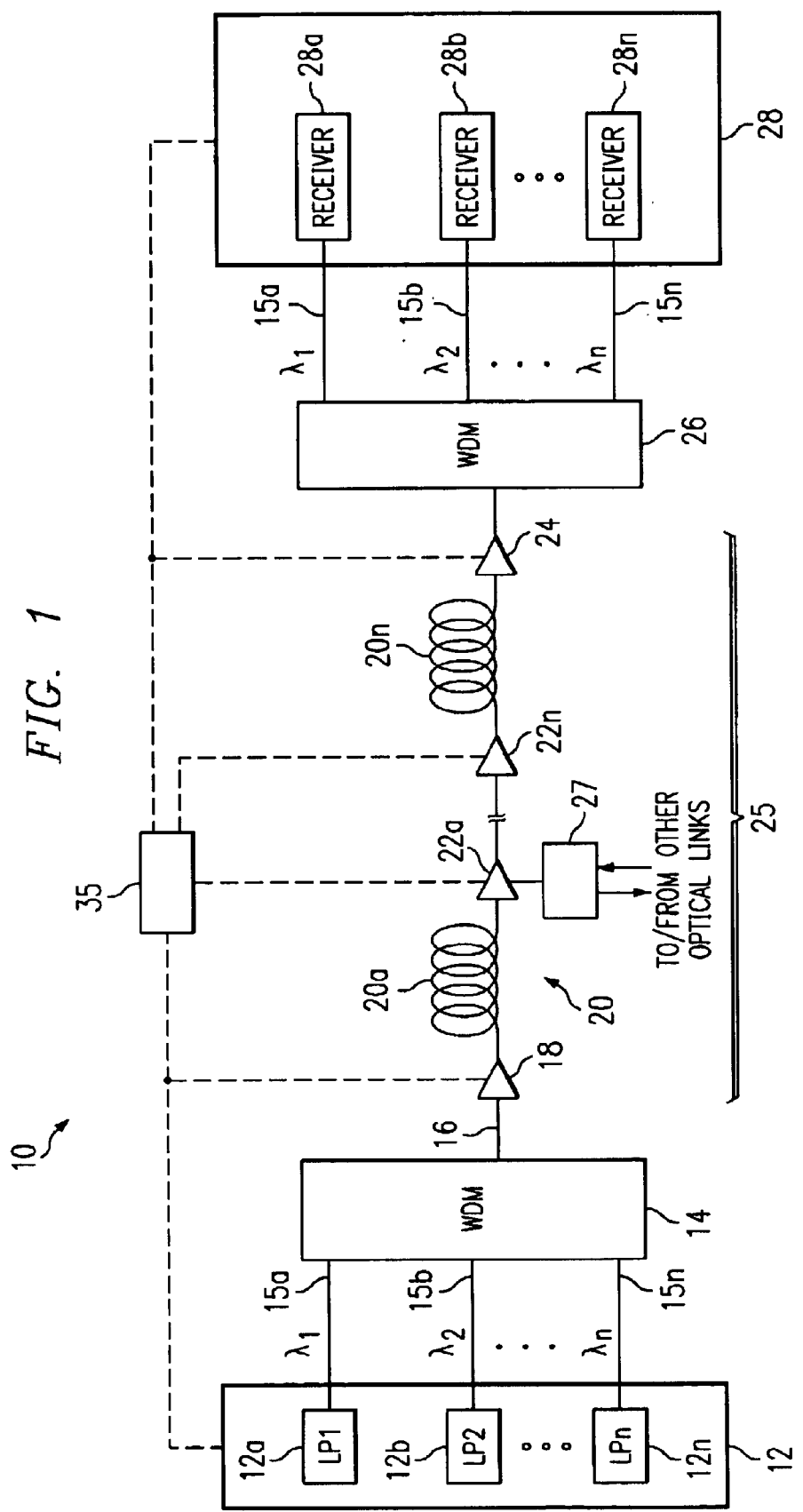
FIG. 1 is a block diagram showing an exemplary optical communication system implementing at least some aspects of the present invention.

FIG. 1 is a block diagram showing an exemplary optical communication system 10 operable to facilitate communication of one or more multiple wavelength signals. System 10 can be configured to provide unidirectional or bi-directional communication of multiple wavelength signals. In this example, system 10 includes a transmitter bank 12 operable to generate a plurality of optical signals (or channels) 15a–15n, each comprising a center wavelength of light. In a particular embodiment, each optical signal 15 can comprise a center wavelength substantially different from the center wavelengths of other optical signals 15. As used throughout this document, the term "center wavelength" refers to a time averaged mean of the spectral distribution of an optical signal. The spectrum surrounding the center wavelength need not be symmetric about the center wavelength. Moreover, there is no requirement that the center wavelength represent a carrier wavelength.

Transmitters 12 could reside, for example, within a transponder capable of transmitting and receiving signals. In one embodiment, the "plurality of transmitters" of transmitter bank 12 comprises a plurality of independent pairs of optical sources and associated modulators. Alternatively, the "plurality of transmitters" could comprise one or more optical sources (shared by a plurality of modulators. For example, transmitter bank 12 could comprise a continuum source transmitter including a modelocked source operable to generate a series of optical pulses and a continuum generator operable to receive a train of pulses from the modelocked source and to spectrally broaden the pulses to form an approximate spectral continuum of signals. The continuum generator could operate, for example, using solition-effect compression or adiabatic solition compression. A signal splitter receives the continuum and separates the continuum into individual signals each having a center wavelength.

Modulators operate to encode information onto the signals received to produce signals 15 for transmission to optical communications medium 20. In some embodiments, transmitter bank 12 can also include a pulse rate multiplexer, such as a time division multiplexer, operable to multiplex pulses received from the mode locked source or the modulator to increase the bit rate of the system.

In the illustrated embodiment, system 10 also includes a combiner 14 operable to receive a plurality of optical signals 15a–15n and to combine those wavelength signals into a multiple wavelength signal 16. As one particular example, combiner 14 could comprise a wavelength division multiplexer (WDM). The terms wavelength division multiplexer and wavelength division demultiplexer as used herein may include equipment operable to process wavelength division multiplexed signals and/or dense wavelength division multiplexed signals.

System 10 communicates multiple wavelength optical signal 16 over an optical communication medium 20. Communication medium 20 can comprise a plurality of spans 20a–20n of fiber, each coupled to or comprising an optical amplifier. In some embodiments all or a portion of a span can serve as a distributed amplification stage. Fiber spans 20a–20n could comprise standard single mode fiber (SMF), dispersion-shifted fiber (DSP), non-zero dispersion-shifted fiber (NZDSF), or another fiber type or combination of fiber types.

Two or more spans of communication medium 20 can collectively form an optical link. In the illustrated example, communication medium 20 includes a single optical link 25 comprising numerous spans 20a–20n. System 10 could include any number of additional links coupled to link 25. Although optical link 25 is shown to include one or more booster amplifiers 18 and preamplifiers 24, one or more of these amplifier types could be eliminated in other embodiments.

In this example, system 10 includes a booster amplifier 18 operable to receive and amplify wavelengths of signal 16 in preparation for transmission over a communication medium 20. Where communication system 10 includes a plurality of fiber spans 20a–20n, system 10 can also include one or more in-line amplifiers 22a–22n. In-line amplifiers 22 couple to one or more spans 20a–20n and operate to amplify signal 16 as it traverses communication medium 20. Optical communication system 10 can also include a preamplifier 24 operable to amplify signal 16 received from a final fiber span 20n.

Throughout this document, the term "amplifier" denotes a device or combination of devices operable to at least partially compensate for at least some of the losses incurred by signals while traversing all or a portion of optical link 25. Likewise, the term "amplification" refers to offsetting at least a portion of losses that would otherwise be incurred.

An amplifier may, or may not impart a net gain to a signal being amplified. Moreover, the term "gain" as used throughout this document, does not—unless explicitly specified—require a net gain. In other words, it is not necessary that a signal experiencing "gain" or "amplification" in an amplifier stage experiences enough gain to overcome all losses in the amplifier stage. As a specific example, distributed Raman amplifiers stages typically do not experience a net gain because of the high losses in the transmission fiber that serves as a gain medium. Nevertheless, these devices are considered "amplifiers" because they offset at least a portion of the losses experienced in the transmission filter.

Amplifiers 18, 22, and 24 could each comprise, for example, a discrete Raman amplifier, a distributed Raman amplifier, a rare earth doped amplifier such as an erbium doped or thulium doped amplifier, a semiconductor amplifier or a combination of these or other amplifier types.

In some embodiments, multiple wavelength signal 16 carries optical signals 15a–15n having center wavelengths ranging across different communications bands (e.g., the short band (S-band), the conventional band (C-band), and/or the long band (L-band)). In those cases, amplifiers 18, 22, and 24 could each comprise a wide band amplifier, each operable to amplify all signal wavelengths received. Alternatively, one or more of those amplifiers could comprise a parallel combination of amplifier assemblies, each operable amplify a portion of the wavelengths of multiple wavelength signal 16. In that case, system 10 could incorporate signal dividers and signal combiners surrounding the parallel combinations of amplifier assemblies to facilitate separation of the wavelength groups prior to amplification and recombination of the wavelengths following amplification.

System 10 may further include one or more access elements 27. For example, access element 27 could comprise an optical add/drop multiplexer, a cross-connect, dispersion compensating element, gain equalizer, or another device operable to terminate, cross-connect, switch, route, process, and/or provide access to and from optical link 25 and another optical link or communication device.

System 10 also includes a separator 26 operable to separate individual optical signals 15a–15n from multiple wavelength signal 16. Separator 26 can communicate individual signal wavelengths or ranges of wavelengths to a bank of receivers 28 and/or other optical communication paths. Separator 26 may comprise, for example, a wavelength division demultiplexer (WDM).

In designing a wavelength division multiplexed optical transmission link including multiple spans of fiber with optical amplifiers interposed between the spans, designers generally calculate a desired signal to noise ratio (SNR) as a function of the number of spans in the system. A launch power for wavelength signals input to the system is than selected that ensures that all channels will achieve the desired SNR, even at wavelengths where the noise figure is highest.

Many conventional design approaches assume that the noise figure for the system is spectrally flat and equal in magnitude to the worst case noise figure for the system. In some systems, therefore, designers apply the same launch power to all wavelength signals. That launch power is selected for all wavelengths based on the signal power needed to achieve a desired SNR at the wavelength experiencing the highest noise figure. Applying a constant launch power to all wavelength signals, however, can be inefficient because the noise figure in implemented optical systems is not always constant.

For example, Raman interaction among the multiple wavelengths of signal 16 causes longer wavelength signals to capture energy from shorter wavelength signals, which tends to result in a larger noise figure at short wavelengths than at longer wavelengths. Moreover, at least in Raman amplifiers, phonon induced noise tends to occur at wavelengths near the wavelength of the pump signals for the amplifiers (typically near the shorter wavelengths being amplified), making the noise figure larger at or near those wavelengths. Therefore, designing an optical communication system assuming a constant noise figure and using a constant signal launch power can result in many channels (at least those at wavelengths experiencing less than the worst case noise figure) being launched at powers far in excess of that needed to achieve the desired SNR. Other systems, rather than using constant launch powers, pre-emphasize launch powers to follow the loss of the fiber or to account for intra-band and/or interband Raman energy exchange. Those systems too, however, result in inefficiencies because all channels are designed with reference to a worst case noise figure. None of these other approaches implement launch powers determined as a function of noise figure.

The embodiment depicted in FIG. 1 addresses this inefficiency by selecting at least some of the launch powers of optical signals 15a–15n to be different in magnitude than others of optical signals 15a–15n. For example, the magnitude of the launch power of at least some of optical signals 15a–15n can be selected depending at least in part on the magnitude of the noise figure associated with at least a portion of system 10 at a wavelength corresponding to the center wavelengths of those optical signals 15.

In one particular embodiment, the launch power of each optical signal 15 input at a given position in system 10 can be separately selected depending at least in part on the magnitude of a noise figure corresponding to the associated wavelength and associated with all or a portion of system 10. Throughout this description, the phrase "launch power" refers to a signal's power at the input to any portion of system 10 over which the noise figure will be measured for use in determining or modifying the signal's launch power.

Signal launch powers may be selected, for example, to achieve a desired SNR at an output location. The output location may comprise, for example, a receiver 28 at an end of optical link 25, or could comprise an access element coupled to link 25. Given the desired output SNR and knowing the noise figure associated with a particular wavelength, the launch signal power for that wavelength can be determined.

It is not necessary that all optical signals 15 have launch powers independently selected with reference to the noise figure. Moreover, even for those wavelength signals having a launch power selected with reference to the noise figure at that wavelength, it is not necessary that each launch power be determined with reference to the same desired SNR. For example, in some cases it may be desirable to select launch powers for one set of optical signals 15 to ensure obtaining a first SNR, while launch powers for another set of optical signals 15 are selected to ensure obtaining a second SNR, different than the first SNR.

This may be advantageous, for example, where some wavelengths are designated as long haul wavelengths, while others are designated for add/drop processing at access elements along link 25. The long haul signals, for example, may require a higher SNR than the signals traversing only a portion of link 25. The launch powers of the long haul signals, therefore, could be determined with reference to one SNR, while launch powers of the other signals are determined with reference to a different SNR. Any number of sets of wavelength signals could have their launch powers determined with respect to different SNRs, depending on the design criteria of the system.

As a particular example of determining the launch power for a signal, assume that an output SNR (in decibels) equals the difference between an input SNR (in decibels) and the noise figure (in decibels) at the output; or, $SNR_{out} = SNR_{in} - NF$. This relationship assumes that all of the signal to noise ratios are referred to the output of an ideal photo diode (e.g., 100% quantum efficiency) and is valid when the input light has the a shot noise limited signal to noise ratio ($SNR_{in} =$ $SNR_{sn1}$) The shot noise limited signal to noise ratio can be represented mathematically as:

$$SNR_{sn1} = P_S + 10\log(\lambda/1 \text{ micron}) + 154.01 \text{ dB} - 10\log(BW/1 \text{ Hz})$$

In that equation, $P_s$ is the launch power of the signal in decibels above one milli-watt (dBm) (which equals $10\log(P_s$ in milli-watts); $\lambda$ is the wavelength of the signal in microns, and BW is the detection bandwidth used for the given wavelength in Hz. For a given bandwidth and a selected $SNR_{out}$, the launch power can be expressed as:

$$P_s = SNR_{out} + 10\log(BW/1 \text{ Hz}) - 154.01 \text{ dB} + NF - 10\log(\lambda/1 \text{ micron})$$

or, simplifying that expression:

$$P_s = C + NF - 10\log(\lambda/1 \text{ micron});$$

where C is a constant that depends on the bandwidth (BW) of the amplified signals and the desired output SNR. Thus, for a given bandwidth and a desired SNR, the launch power $P_s$ of each optical signal 15 can be expressed as a function of the noise figure; that function having a small dependence on the wavelength of the signal. For a desired SNR, the signal launch power can be determined based on the noise figure without reference to the (/1 micron) wavelength dependence, resulting in a small variance in the SNR of the system (typically around 0.3 decibels over a bandwidth of 100 nanometers). Alternatively, the signal launch powers can be determined with reference to the noise figure and accounting for the wavelength dependence, resulting in a flat SNR.

Given one or more desired SNRs, the launch powers of optical signals 15 can be selectively determined through any of a variety of mechanisms. For example, a drive current applied to optical sources generating optical signals 15 could be adjusted. As another example, optical signals 15 could each be generated at a common power, and applied to a variable attenuator operable to attenuate some wavelengths more than others to result in the desired distribution of launch powers.

A launch power that is selected with reference to the noise figure can be determined initially with respect to the noise figure, and/or may be adjusted from time to time with respect to the noise figure. For example, in some embodiments, signal launch powers are initially selected during system setup by comparing the signal powers with the noise figure and adjusting the signal launch powers accordingly. In other embodiments, signal launch powers are monitored continuously, periodically, or on a random basis during system operation and adjusted in power depending on the shape and magnitude of the noise figure at that time. These embodiments can help account for changes in the shape and/or magnitude of the noise figure due to changes in system characteristics over time, such as temperature variations or aging of components and addition/subtraction of channels being communicated.

The noise figure used to influence the magnitude of the launch powers of one or more of optical signals 15 can be determined at various locations within system 10. For example, the noise figure for the entire system 10 could be determined at receivers 28a–28n and used for determining launch powers for optical signals 15. Alternatively, the noise figure for a portion of system 10 could be measured at a location along link 25, such as an optical add/drop multiplexer, where one or more optical signals 15 are added or dropped from multiple wavelength signal 16.

This technique is not limited to controlling the launch power of signals generated at transmitters 12 associated with link 25. The technique could also be applied to signals 15 initially launched on other optical links and later combined with multiple wavelength signal 16 on optical link 25.

In some embodiments, system 10 can also comprise a management system 35 operable to track and/or manage various aspects of operation of system 10 and/or the components therein. For example, management system 35 could comprise hardware, software, firmware, or a combination thereof operable to selectively adjust the launch power to a optical signal 15 and/or a pump power applied to an amplifier in system 10. In some embodiments, management system 35 can measure or receive a noise figure associated with all or a portion of system 10, determine launch powers for signals 15 based at least in part on the noise figure, and communicate control signals to adjust launch powers of one or more signals 15 accordingly.

Although the illustrated embodiment shows management system 35 directly coupled to each amplifier, transmitter, and receiver, management system could alternatively communicate with some or all of those devices via communication medium 20 using, for example, an optical service channel. Furthermore, management system 35 need not, in all embodiments, communicate with all amplifiers, transmitters, and receivers. Although management system 35 is depicted as a single entity located remotely from amplifiers 18–24, all or a part of management system 35 could alternatively reside locally to one or more amplifiers, transmitters, and/or receivers in system 10.

Management system 35 could be used to aid in manually configuring system 10, or could operate to dynamically configure system 10 initially and/or as it continues to operate. Management system 35 could be used to initially set launch powers for optical signals 15 and/or to periodically, randomly, or on demand reconfigure launch powers of optical signals 15 to account for changing system parameters.

By setting launch powers of at least some of the optical signals 15 with reference to a noise figure associated with at least a portion of system 10, this embodiment provides an advantage of reducing the total launched signal power. Reducing the launched signal power reduces the intensity of light at the connectors and other components, increasing the reliability of system 10. Additionally, reduced launched signal power allows for use of lower powered pumps in amplifiers within system 10. Reducing the pump power required generally results in decreased system costs.

As an additional benefit this technique facilitates freedom in design of gain profiles in the multiple stage amplifiers. Because signal launch power is selected to at least partially address the noise figure issue, gain profiles of the amplifiers can be selected with less regard to maintaining a particular noise figure shape or level. For example, because the signal launch power settings can be adjusted to deal with the noise figure, a single stage amplifier with a flat gain profile or a multiple stage amplifier with flat gain profiles in each stage can be used without requiring excessive signal launch powers. Alternatively, gain profiles in multiple stage amplifiers can be tailored to accomplish other functions, such as reducing the average noise figure of the amplifier or reducing the total pump power used by the amplifier. Various example multiple stage amplifier designs are discussed below with respect to FIGS. 4–7.

Although this technique applies to and benefits many amplifier types, at least the following additional advantages can be realized when applying this technique to systems using Raman amplification. For example, when implemented in a Raman amplification system, this technique results in reduced non-linear penalties, such as four-wave mixing and Brillouin effect, which tend to be less prevalent at lower signal powers. Furthermore, at least in Raman amplifiers, the noise figure tends to be larger at shorter wavelengths. Using the above-described technique, shorter wavelengths will often have larger launch powers to compensate for the larger noise figure. The increased power in shorter optical signals 15 promotes signal-signal interaction and transfer of some of the launch power of shorter optical signals 15 to longer optical signals 15, further reducing the pump power necessary to achieve a desired gain.

Figure 2A:
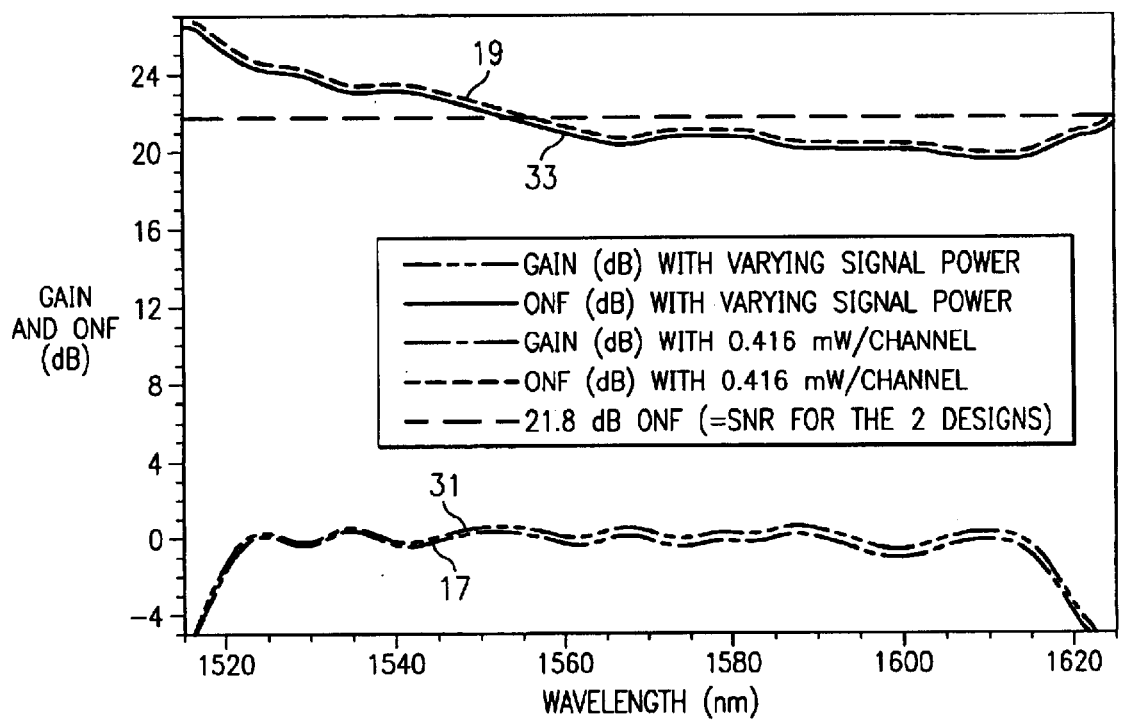
FIGS. 2a–2b are graphs illustrating simulated gain and noise figure curves for an example amplifier design implementing approximately flat gain profiles in each amplifier stage.

FIG. 2a is a graph illustrating simulated gain and noise figure curves for a two stage Raman amplifier design implementing approximately flat gain profiles in each amplifier stage. In particular, this simulation assumes a two stage Raman amplifier having a first stage comprising a distributed Raman amplification stage utilizing approximately eighty kilometers of SMF-28 fiber, and a second stage comprising a discrete Raman amplification stage utilizing a length of DK-80 dipersion compensating fiber; The gain profiles for each amplifier stage are substantially flat, simplifying the amplifier design. Table 1 below shows pump wavelength locations and powers for each stage.

TABLE 1

| Flat Profile Two Stage Amplifier Applying 0.416 mW/Channel | | Flat Profile Two Stage Amplifier Applying Varying Signal Power | |
|---|---|---|---|
| Pump λ | Power (W) | Pump λ | Power (W) |
| 80 km SMF-28 | | 80 km SMF-28 | |
| 1396 nm | .56 | 1396 nm | .56 |
| 1416 nm | .56 | 1416 nm | .56 |
| 1427 nm | .56 | 1427 nm | .56 |
| 1455 nm | .25 | 1455 nm | .25 |
| 1472 nm | .1 | 1472 nm | .1 |
| 1505 nm | .085 | 1505 nm | .085 |
| DK-80 | | DK-80 | |
| 1405 nm | .47 | 1405 nm | .47 |
| 1418 nm | .53 | 1418 nm | .53 |
| 1445 nm | .31 | 1445 nm | .31 |
| 1476 nm | .085 | 1476 nm | .085 |
| 1509.5 nm | .025 | 1509.5 nm | .025 |
| Total Pump Power: | 3.535 W | Total Pump Power: | 3.535 W |

This example simulates result for the amplifier in two configurations. In both cases, the total launched power among 250 optical signals 15 was 104 milli-watts. In the first configuration, each of optical signals 15 was launched at 0.416 milli-watts. In the second configuration, the total launched power was distributed among the optical signals 15 with reference to the noise figure of the amplifier to achieve an SNR of approximately 33.2 decibels, resulting in higher launched signal powers at shorter wavelengths where the noise figure was larger. In particular, launch powers of optical signals 15 were determined by applying the following equation:

$$P_s = -25.6 \text{ dBm} + NF \text{ (for each signal wavelength).}$$

Note that this equation does not consider the 10log(/1 micron) wavelength dependence. As a result, there will be a slight variation in the SNR as a function of wavelength.

Line 17 in FIG. 2a shows the overall gain curve and line 19 shows the noise figure for the first embodiment (constant launch power). Line 31 in FIG. 2a shows the overall gain curve and line 33 shows the noise figure for the second embodiment (variable launch power). As shown in this figure, varying the signal power as a function of the amplifier noise figure does not result in any significant penalty in terms of peak noise figure or flatness of gain curve. In fact, in this embodiment, varying the launched power as a function of the noise figure results in a lower peak noise figure and an increased gain level. The lower peak noise figure is likely attributable to the lower launched power, which reduces noise caused by signal-signal interactions in the amplifier.

Figure 2B:
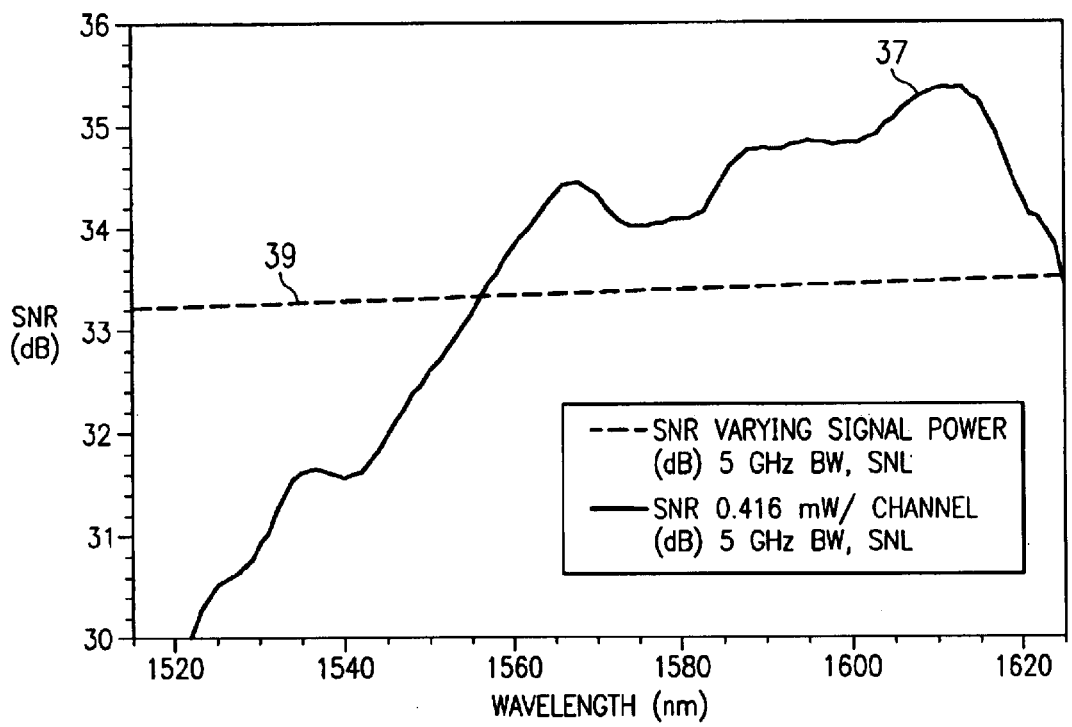

FIG. 2b is a graph showing the SNR resulting from the simulations shown in FIG. 2a and assuming a receiver detection bandwidth of 5 gigahertz. In particular, line 37 shows the SNR for the constant launch power embodiment, while line 39 shows the SNR for the variable launch power embodiment. As shown in this figure, the variable launch power embodiment results in an approximately flat SNR across the amplified bandwidth, varying by about 0.3 decibels from 1515 nanometers to 1625 nanometers. This logically follows from the fact that the launch powers of optical signals 15 were selected based on the noise figure at each wavelength.

The slight variance in SNR 39 (the varying launch power embodiment) results from the slight wavelength dependence of the SNR, which was not considered in determining launch powers in this example. In another embodiment, signal powers could be selected based on a combination of the variance in the noise figure and the center wavelength of the signal 15, to result in a completely flat SNR.

The constant launch power embodiment shows a significantly varying SNR 37 over the bandwidth of amplified wavelengths, varying by over five decibels. This results because the signal launch powers remain constant while the noise figure varies as a function of wavelength. Because the launch power remained constant in that embodiment, SNR 37 is lowest where the noise figure is the highest.

At those wavelengths, SNR 37 is significantly below SNR 39 For example, at approximately 1522 nanometers, the SNR 39 for the variable launch power embodiment is more than three decibels higher than the SNR 37 for the constant launch power embodiment. If one were to use a constant launch power embodiment and require an SNR equal to that of the variable launch power embodiment across the entire amplified bandwidth, it would be necessary to increase the launch power of all optical signals 15 by more than three decibels in the constant launch power embodiment. This results in inefficiency because launch powers would be increased unnecessarily where the noise figure is low. The variable launch power embodiment, therefore, can result in efficiencies over a constant launch power approach.

Figure 3A:
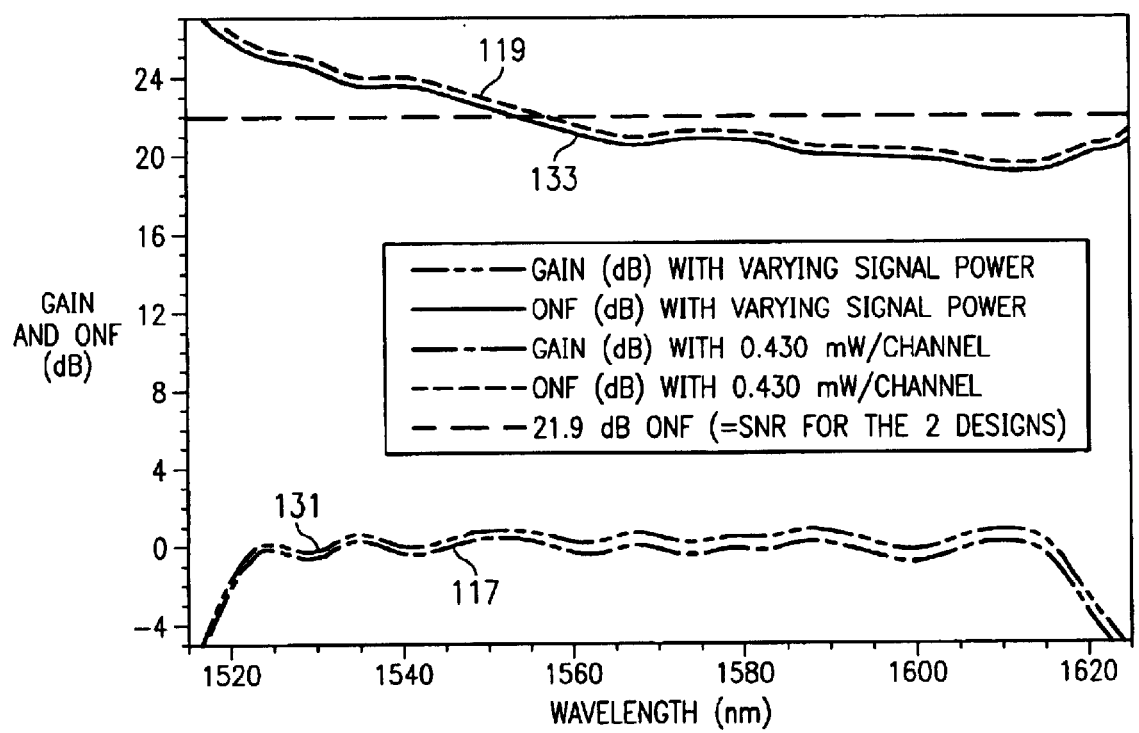
FIGS. 3a–3b are graphs illustrating simulated gain and noise figure curves for another example amplifier design implementing approximately flat gain profiles in each amplifier stage.

FIG. 3a is a graph illustrating simulated gain and noise figure curves for another embodiment of a two stage Raman amplifier design implementing approximately flat gain profiles in each amplifier stage. In particular, this simulation assumes a two stage Raman amplifier having a first stage comprising a distributed Raman amplification stage utilizing approximately eighty kilometers of non-zero dispersion shifted fiber (NZDSF), and a second stage comprising a discrete Raman amplification stage utilizing a length of DK-80 dispersion compensating fiber. The gain profiles for each amplifier stage are substantially flat. Table 2 below shows pump wavelength locations and powers for each stage.

TABLE 2

| Flat Profile Two Stage Amplifier Applying 0.430 mW/Channel | | Flat Profile Two Stage Amplifier Applying Varying Signal Power | |
|---|---|---|---|
| Pump λ | Power (W) | Pump λ | Power (W) |
| 80 km NZDSF | | 80 km NZDSF | |
| 1396 nm | .343 | 1396 nm | .343 |
| 1416 nm | .343 | 1416 nm | .343 |
| 1427 nm | .343 | 1427 nm | .343 |
| 1455 nm | .153 | 1455 nm | .153 |
| 1472 nm | .0612 | 1472 nm | .0612 |
| 1505 nm | .052 | 1505 nm | .052 |
| DK-80 | | DK-80 | |
| 1405 nm | .47 | 1405 nm | .47 |
| 1418 nm | .55 | 1418 nm | .55 |
| 1445 nm | .33 | 1445 nm | .33 |
| 1476 nm | .083 | 1476 nm | .083 |
| 1509.5 nm | .023 | 1509.5 nm | .023 |
| Total Pump Power: | 2.7512 W | Total Pump Power: | 2.7512 W |

This example simulates results for the amplifier in two configurations. In both cases, the total launched signal power among 250 optical signals 15 was approximately 107 milli-watts. In the first configuration, each of optical signals 15 was launched at 0.430 milli-watts. In the second configuration, the total launched power was distributed among the optical signals 15 with reference to the noise figure of the amplifier to achieve an SNR of approximately 33.2 decibels, resulting in higher launched signal powers at shorter wavelengths where the noise figure was larger. In particular, launch powers of optical signals 15 were determined by applying the following equation:

$$P_s = -25.6 \text{ dBm} + NF.$$

Line 117 in FIG. 3a shows the overall gain curve and line 119 shows the noise figure for the first embodiment (constant launch power). Line 131 in FIG. 3a shows the overall gain curve and line 133 shows the noise figure for the second embodiment (variable launch power). As shown in this figure, varying the signal power as a function of the amplifier noise figure does not result in any significant penalty in terms of peak noise figure or flatness of gain curve, but rather results in a lower peak noise figure and an increased gain level.

Figure 3B:
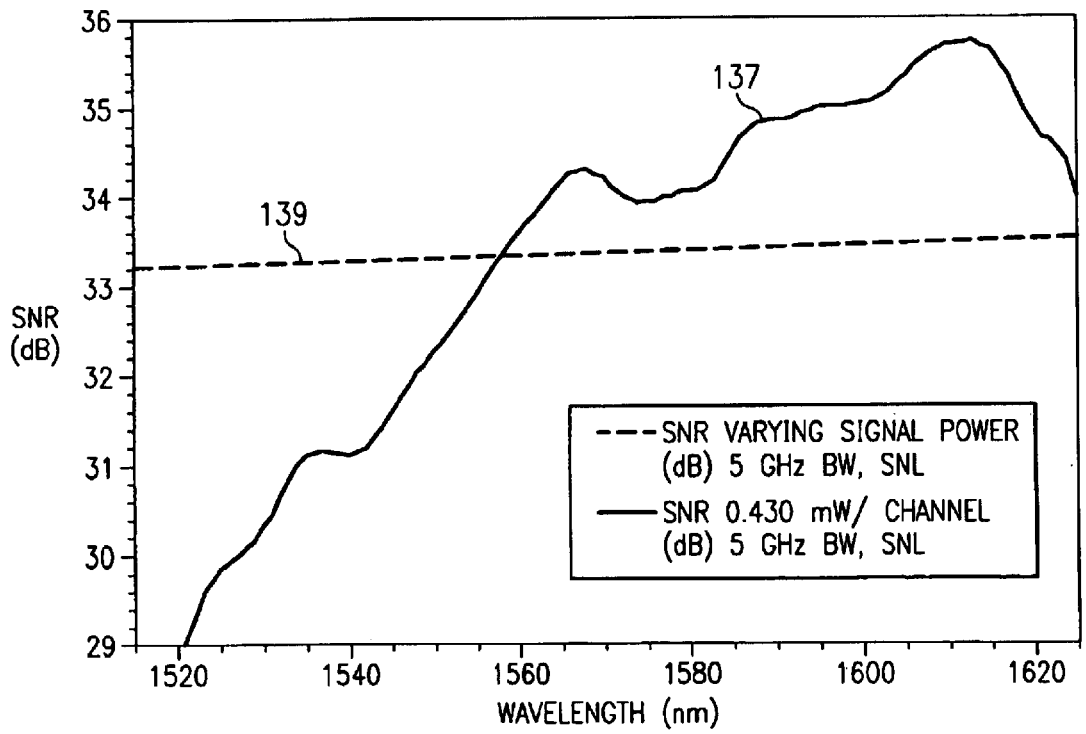

FIG. 3b is a graph showing the SNR resulting from the simulations shown in FIG. 3a and assuming a receiver detection bandwidth of 5 gigahertz. In particular, line 137 shows the SNR for the constant launch power embodiment, while line 139 shows the SNR for the variable launch power embodiment. Again, the variable launch power embodiment results in an approximately flat SNR 139 across the amplified bandwidth, in this case varying by approximately 0.3 decibels from 1515 nanometers to 1625 nanometers. Again, in this example, signal launch powers were selected without reference to the wavelength dependence of the SNR resulting in a slight variance in the SNR. Accounting for this wavelength dependence can result in a completely flat SNR.

The constant launch power embodiment shows a significantly varying SNR 137 over the bandwidth of amplified wavelengths, varying by more than six decibels. Because the launch power remained constant in that embodiment, SNR 137 is lowest where the noise figure is the highest. At those wavelengths, SNR 137 is significantly below SNR 139. For example, at approximately 1522 nanometers, the SNR 139 for the variable launch power embodiment is nearly four decibels higher than the SNR 137 for the constant launch power embodiment. To use a constant launch power embodiment and ensure an SNR equal to that of the variable launch power embodiment across the entire amplified bandwidth, it would be necessary to increase the launch power of all optical signals 15 by nearly four decibels, resulting in significant additional launch power.

Although FIGS. 2 and 3 were described with respect to a Raman amplification system, similar results can be obtained using any amplifier type. The examples described herein with respect to Raman amplification systems are presented for illustrative purposes only.

As discussed above, varying signal launch powers with reference to a noise figure of all or a portion of the system provides an advantage of allowing the use of flat gain profiles in the amplifiers. This facilitates simplification of amplifier design and can result in more inexpensive amplifiers. At the same time, this approach ensures a desired SNR without requiring excessive launch powers across all amplified wavelengths.

As further indicated above, addressing the noise figure issue through varying launch powers allows freedom of design in amplifier gain profiles to address various design concerns. Using launch powers that vary by wavelength, multiple stage amplifiers can implement gain profiles in each amplification stage that are tailored to bring about particular desirable results. For example, gain profiles can be selected to reduce the average noise figure of the amplifier, or to reduce the pump power required to provide a particular gain.

FIGS. 4a–4c illustrate an exemplary embodiment of a multiple stage amplifier 100 including gain profiles 30 and 40 associated with various amplification stages and an overall gain profile 50 for the amplifier. The embodiment shown in FIG. 4a provides an example of a multiple stage amplifier 100 receiving variable launch power signals and implementing non-flat gain profiles in at least some stages to reduce the peak noise figure of the amplifier. By reducing the peak noise figure, amplifier 100 facilitates reducing the launch power needed to achieve a given SNR even where the signal launch powers are held constant across the amplification bandwidth. Reducing the signal launch power reduces stress on system components and reduces pump powers needed to generate the correspondingly lower powered output signals.

While the examples described with respect to FIGS. 2 and 3 comprise multiple stage amplifiers having approximately flat gain profiles in each stage, the amplifiers depicted in FIG. 4 comprises multiple amplification stages having varying gain profiles, which are approximately complimentary to one another.

Throughout this description, the phrase "approximately complementary" refers to a situation where, at least in general, wavelength signals that are highly amplified in the first stage are less amplified in the second stage, and wavelength signals that are highly amplified in the second stage are less amplified in the first stage. Two gain profiles said to be "approximately complementary" need not have equal and opposite slopes. Moreover, equal amplification of any particular wavelengths in both gain profiles does preclude those gain profiles from being "approximately complementary."

Approximately complementary gain profiles may have one or more slopes associated with each gain profile. For example, approximately complementary gain profiles could comprise a "W" shaped profile followed by an "M" shaped profile, or an "M" shaped profile followed by a "W" shaped profile. Furthermore, the approximately complementary gain profiles may become approximately complementary only after traversing all or a portion of the transmission medium. In those cases, the gain profiles launched at the beginning of the amplifier stage may not be approximately complementary, but may become approximately complementary after signals traverse all or a portion of the transmission medium.

While best results are obtained by applying approximately complimentary gain profiles to all or nearly all of the same signal wavelengths, some portion of wavelengths can be omitted from one gain profile and included in the other gain profile without departing from the scope of this invention.

Conventional designs of multi-stage amplifiers have experienced difficulties processing bandwidths in excess of 80 nanometers while maintaining approximately flat gain profiles and acceptable noise figures. For example, in Raman amplifiers, a major culprit in noise figures is the phonon-stimulated optical noise created when wavelength signals being amplified reside spectrally close to pump wavelengths used for amplification. The embodiment shown in FIG. 4a reduces adverse effect of this noise by enhancing the Raman amplification of signal wavelengths near the pump wavelengths to overcome the effects of the noise, and applying an approximately complementary gain profile in another stage to result in an approximately flat overall gain profile with a reduced noise figure.

In this example, amplifier 100 comprises a two-stage amplifier having a first stage 112 and a second stage 114 cascaded with first stage 122. There is no limit to a particular number of amplifier stages. For example, additional amplification stages could be cascaded onto second stage 114. Moreover, although the illustrated embodiment shows second stage 114 cascaded directly to first stage 112, additional amplification stages could reside between first stage 112 and second stage 114 without departing from the scope of the invention.

Amplifier 100 could comprise a distributed Raman amplifier, a discrete Raman amplifier, a hybrid Raman amplifier which comprises both discrete and distributed stages, a rare earth doped amplifier, a semiconductor amplifier, or another amplifier type or combination of amplifier types. Each stage 112, 114 of amplifier 100 includes an input operable to receive a multiple wavelength optical input signal 116 As a particular example, signal 116 could include wavelengths ranging over one hundred nanometers.

Each stage 112, 114 also includes a gain medium 120, 121. Depending on the type of amplifier being implemented, media 120, 121 may comprise, for example a gain fiber or a transmission fiber. In a particular embodiment, media 120, 121 may comprise dispersion compensating fibers.

Each stage 112, 114 further includes one or more wavelength pumps 122. Pumps 122 generate pump light 124 at specified wavelengths, which are pumped into distributed gain media 120, 121. Pumps 122 may comprise, for example, one or more laser diodes. Although the illustrated embodiment shows the use of counter propagating pumps, under at least some circumstances using a relatively quiet pump, co-propagating pumps could also be used without departing from the scope of the invention.

In one particular embodiment, pump wavelengths 124 can be selected so that the longest wavelength pump signal 124 has a wavelength that is shorter than the shortest wavelength of signal 116 As one specific example, the longest wavelength of pump light 124 could be selected to be, for example, at least ten nanometers shorter than the shortest wavelength of signal 116. In this manner, amplifier 100 can help to avoid phonon stimulated noise that otherwise occurs when pump wavelengths interact with wavelengths of the amplified signal.

Couplers 118b and 118c couple pump wavelengths 124a and 124b to gain distributed media 120 and 125, respectively. Couplers 118 could comprise, for example, wavelength division multiplexers or optical couplers. A lossy element 126 can optionally reside between amplifier stages 112 and 114. Lossy element 126 could comprise, for example, an isolator, an optical add/drop multiplexer, or a gain equalizer.

The number of pump wavelengths 124, their launch powers, their spectral and spatial positions with respect to other pump wavelengths and other wavelength signals, and the bandwidth and power level of the signal being amplified can all contribute to the shape of the gain profile for the respective amplifier stage.

FIG. 4b shows exemplary gain profiles for first stage 112 and second stage 114. Gain profile 30 shows the overall gain of first stage 112 of amplifier 100 for a bandwidth ranging from the shortest wavelength of signal 116 ($\lambda_{sh}$) to the longest wavelength of signal 116 ($\lambda_{lg}$). Gain profile 40 shows the overall gain of second stage 112 of amplifier 100 for a bandwidth ranging from the shortest wavelength of signal 116 ($\lambda_{sh}$) to the longest wavelength of signal 116 ($\lambda_{lg}$). Each of gain profiles 30 and 40 reflects the effects of the other gain profile acting upon it.

In this example, gain profile 30 of first stage 112 has primarily a downward slope, where a majority of the shorter signal wavelengths 116 are amplified more than a majority of the longer signal wavelengths 116. Conversely, gain profile 40 of second stage 114 is approximately complimentary to gain profile 30 of first stage 122. Gain profile 40 exhibits primarily an upward slope where a majority of the longer signal wavelengths 116 are amplified more than a majority of the shorter signal wavelengths 116 .

Although gain profiles 30 and 40 are for simplicity depicted as each having substantially one slope, the slope of each gain profile may change numerous times. Moreover, it is not necessary that the entire slope of gain profile 30 be negative, or that the entire slope of gain profile 40 be positive. Each profile may exhibit any number of peaks and valleys over the amplified bandwidth.

Gain profile 50 (shown in dotted lines in FIG. 4c) represents an exemplary overall gain profile of amplifier 100 resulting from the application of gain profiles 30 and 40 to signal 116. Overall gain profile 50 is approximately flat over at least substantially all of the bandwidth of wavelengths within signal 116.

This particular example provides a significant advantage in reducing the peak noise figure associated with the amplifier using complementary gain profiles. The complementary gain profiles reduce the peak noise figure by amplifying signals closest to the pump wavelengths at higher levels the signals at wavelengths far from the pump wavelengths. In addition, the noise figure is reduced by amplifying longer wavelength signals in a later amplifier stage. Moreover, implementing varying launch powers reduces the total launched signal power, which, in Raman amplifiers, reduces noise generated from the signal-signal interactions. In a discrete amplifier embodiment, using this type of configuration, the noise figure of amplifier 100 in the small signal limit can be reduced to less than eight decibels, in some cases 7 decibels, even where the bandwidth of signal 16 exceeds 100 nanometers.

Complementary gain profiles can also be used to reduce the pump power requirements for a given amplifier. When this technique is combined with a technique of varying signal launch powers with reference to the noise figure, a high efficiency system can result, which uses relatively lower total pump power and relatively lower total signal launch power.

FIGS. 5a–5c illustrate a high pump efficiency embodiment of a multiple stage amplifier 110 including exemplary gain profiles 130 and 140 associated with various amplification stages and an overall gain profile 150 for the amplifier. Amplifier 110 shown in FIG. 5a is similar in structure and function to amplifier 100 shown in FIG. 4a. Like amplifier 100 shown in FIG. 4a, amplifier 110 of FIG. 5a includes a first amplification stage 112 and a second amplification stage 114. Each of stages 112 and 114 includes a gain medium 120, 121, respectively, which is operable to receive multiple wavelength input signal 116 and pump wavelengths 124a and 124b, respectively. Each amplifier stage 112 and 114 operates to amplify wavelengths of signal 116 according to gain profiles 130 and 140 as shown. In this example, at least first stage 112 comprises a Raman amplification stage. Second stage 114 could comprise a Raman amplification stage, or another type of amplification stage.

The example shown in FIG. 5 differs from the example shown in FIG. 4 in that gain profile 130 (shown in FIG. 5b) of first stage 112 exhibits primarily an upward slope where a majority of longer wavelengths of signal 116 are amplified more than the majority of shorter wavelengths of signal 116. Conversely, gain profile 140 of second stage 114 comprises an approximately complementary gain profile to first gain profile 130 of first stage 122. Profile 140 applies a higher gain to a majority of shorter wavelengths than the gain applied to the majority of longer signal wavelengths 116. In addition, in this embodiment, the power of pumps 122a driving first gain profile 130 can be reduced.

The Raman scattering effect transfers energy from shorter wavelength signals to longer wavelength signals. This embodiment leverages that fact to allow the longer pump wavelengths of Raman first stage 112 to accept energy from the shorter pump wavelengths of second stage. In a particular embodiment, amplifier 110 may include a shunt 160 between second gain medium 121 and first gain medium 120 to facilitate the longer pump wavelengths of first stage 112 accepting power from the shorter pump wavelengths of second stage 114. The combined effects of first stage 112 and second stage 114 result in an overall gain profile 150 (FIG. 5c) of the amplifier that remains approximately flat.

This embodiment provides significant advantages in terms of efficiency by allowing the use of fewer wavelength pumps 122a in the first stage 112, and/or also by allowing each pump 122a to operate at a lower launch power. By selecting signal launch powers with reference to the noise figure of the amplifier, this embodiment enjoys the further efficiency of reduced overall launched signal power.

The embodiment shown in FIG. 5a can also provide improvements for the noise figure of the amplifier. For example, phonon stimulated noise is created in Raman amplifiers where wavelengths being amplified spectrally reside close to a wavelength of pump signals 124. By spectrally separating pump wavelengths 124 from signal wavelengths 116, phonon stimulated noise can be reduced.

In a particular embodiment, pump wavelengths 124 are selected to have wavelengths at least 10 nanometers shorter than the shortest wavelength in signal 116 being amplified. Moreover, in a particular embodiment, second stage 114, where a majority of the gain to short wavelengths of signal 116 is applied, comprises the last stage of amplifier 110.

Although the embodiments shown in FIGS. 4–5 show two complementary amplification stages, additional complementary amplification stages could also be implemented.

Figure 6A:
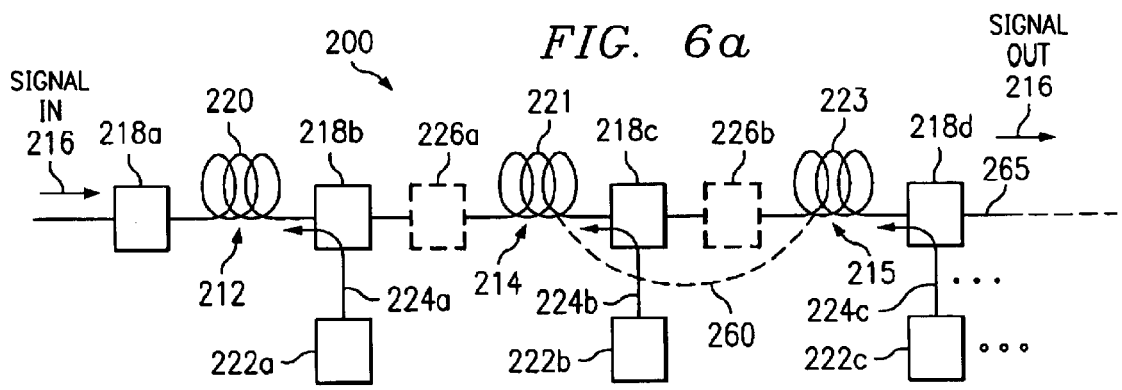
FIGS. 6a–6c illustrate another exemplary embodiment of a multiple stage amplifier including at least three amplification stages, gain profiles associated with various amplification stages of the amplifier, and an overall gain profile for the amplifier, respectively.
Figure 6B:
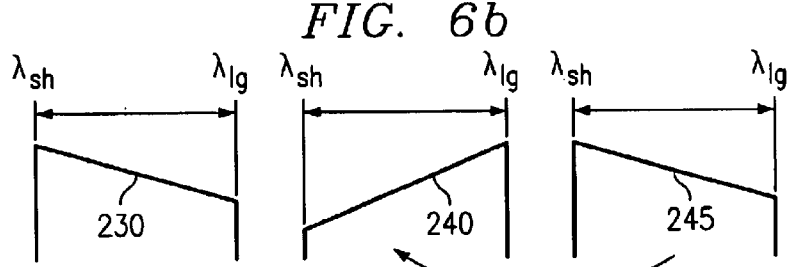
Figure 6C:
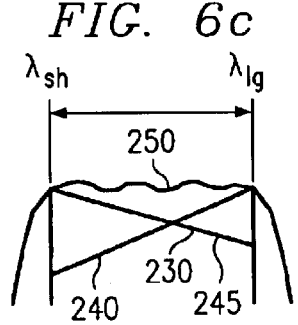

FIG. 6a is a block diagram of a three stage amplifier 200 including gain profiles 230, 240, and 245 associated with various amplification stages, and an overall gain profile 250 for the amplifier. Amplifier 200 is similar in structure and function to amplifier 100 of FIG. 4 but includes three cascaded amplification stages 212, 214, and 215. Each of amplifier stages 212–215 includes a gain medium 220, 221, 223, respectively, which operates to receive multiple wavelength signal 216 and pump wavelengths 224a–224c from pumps 222a–222c. At least second amplifier stage 214 comprises a Raman amplification stage. Each amplifier stage includes an optical coupler operable to introduce pump wavelengths 224 to the respective gain media. In some embodiments, lossy elements 226 may reside between one or more amplification stages 212–215. Lossy elements 226 may comprise, for example, optical add/drop multiplexers, isolators, and/or gain equalizers.

In this particular example, first stage 212 and second stage 214 operate in a similar manner to amplifier 100 shown in FIG. 4a. In particular, first stage 212 applies a gain profile 230 that amplifies a majority of shorter signal wavelengths 216 more than it amplifies a majority of longer signal wavelengths 216. Second stage 214, conversely, applies and approximately complimentary gain profile 240 to signal 216, where the majority of longer wavelengths of signal 216 are amplified more than a majority of shorter wavelengths of signal 216.

The combination of second stage 214 and third stage 215, on the other hand, operates similarly to amplifier 110 shown in FIG. 5a. While second stage 214 applies gain profile 240 amplifying a majority of longer signal wavelengths 216 more than a majority of shorter signal wavelengths 216, third stage 215 applies to gain profile 245, which amplifies a majority of shorter signal wavelengths 216 more than a majority of longer signal wavelengths 216. The composite gain profile 250 (shown in FIG. 6c) resulting from the combination of amplifications in first, second, and third amplifier stages of amplifier 200 results in an approximately flat overall gain profile for the amplifier.

This particular example reaps the efficiency benefits discussed with respect to FIG. 5, and permits use of the noise figure reduction techniques discussed with respect to FIGS. 4 and 5. For example, efficiency advantages are realized by allowing longer pump wavelengths 224b of second stage 214 to accept power from high powered shorter pump wavelengths 224c of third amplification stage 215. This results from the Raman effect wherein longer wavelength signals accept energy from shorter wavelength signals. As a result, second stage 214 can be operated with fewer wavelength pumps than what otherwise be required, and also with lower pump launch powers.

In terms of improvements in noise figure, the gain profiles of first stage 212 compared to second stage 214 result in high amplification of shorter wavelengths of signal 216 to overcome phonon stimulated noise associated with interaction of those signals with the longer pump wavelengths 224a. In addition, providing a significant amount of amplification to shorter wavelengths of signal 216 in the last stage 215 of amplifier 220 helps to minimize the noise figure associated with amplifier 200.

Moreover, applying varied signal launch powers depending at least in part on the noise figure of the amplifier results in reducing the total signal launch power, further increasing the efficiency of the system.

FIGS. 7a–7c illustrate a four stage amplifier, gain profiles associated with various stages of the amplifier, and a composite gain of the amplifier respectively. In this example, amplifier 300 includes four amplification stages 312, 314, 315, and 317. At least third stage 315 comprises a Raman amplification stage.

As shown in FIG. 7b, first stage 312 applies a gain profile 330 where a majority of shorter signal wavelengths are amplified more than a majority of longer signal wavelengths, and second stage 314 applies an approximately complimentary gain profile 335 where a majority of longer signal wavelengths are amplified more than a majority of shorter signal wavelengths. In this particular embodiment, the composite gain from first stage 312 and second stage 314 results in an approximately flat overall gain profile at the output of second stage 314.

Because the composite gain curve for the amplifier is approximately flat, this design advantageously facilitates addition and subtraction of particular wavelengths of signal 316 without the need for further manipulation of the gain. In addition, first and second gain stages 312 and 314 provide a low noise figure, reducing the effects of phonon stimulated noise in shorter wavelength signals closest to the pump wavelengths.

Particular wavelengths of signal 316 may be substituted with other wavelengths at access element 326b. After processing by access element 326b, signal 316 continues to third amplification stage 315, where gain profile 340 is applied as shown in FIG. 7b. Signal 316 is then communicated to fourth stage 317 where gain profile 345 is applied to wavelengths of signal 316. Amplified signal 316 is then output at output port 365.

Third and fourth amplification stages of amplifier 300 are similar in structure and function to amplifier 110 described with respect to FIG. 5. Through the use of this configuration, third and fourth amplifier stages 315 and 317 provide increased efficiency in operation. In particular, pump 322 can operate with fewer pump signals and/or lower pump power as a result of the Raman scattering effect which allows longer pump wavelengths 324c of Raman third stage 315 to accept power from shorter pump wavelengths 324d of fourth amplification stage 317. Moreover, third and fourth amplification stages 315 and 317 assist in maintaining a low noise figure by applying a significant amount of the gain to the shortest wavelengths of signal 316 at the last amplifier stage 317.

As in other embodiments, applying varied signal launch powers depending at least in part on the noise figure of the amplifier results in reducing the total signal launch power, further increasing the efficiency of the system.

Amplifiers depicted in FIGS. 4–7 can comprises wide band amplifiers operable to receive and amplify a wide bandwidth of multiple wavelength signal 16. In particular embodiments, the amplifiers can process over 80 nanometers of bandwidth, and in some cases over 100 nanometers of bandwidth while maintaining an approximately flat overall gain profile over the bandwidth of amplified signal wavelengths 16.

Throughout this document, the term "approximately flat overall gain profile" describes a condition where the maximum signal gain at the output of the amplifier differs from the minimum signal gain at the output of the amplifier by an no more than amount suitable for use in telecommunication systems over an operational bandwidth of information carrying channels. Deviation of the maximum and minimum signal gain over one or two of several channels is not intended to be outside of the scope of an approximately flat overall gain profile. The deviation between minimum and maximum signal gains may comprise, for example five decibels prior to application of any gain flattening filters over an operational bandwidth of, for example, 40 nanometers or more. Particular embodiments of the invention may achieve gain flatness of approximately three decibels or less prior to application of any gain flattening filters over an operational bandwidth.

Implementing launch signal powers that vary by wavelength according to a noise figure associated with at least part of the system in combination with various amplifier gain profiles provides significant freedom in designing wide bandwidth amplifiers. As discussed above, varying signal launch powers can be combined with flat gain profile amplifiers to provide a simple amplifier design, which ensures a desired SNR, while minimizing the total launched signal power. In other embodiments, signal launch powers that vary by wavelength with the noise figure can be combined with more complex amplifier designs having sloped gain profiles in multiple amplifier stages. Combining varying signal power with these techniques can result in lower noise figures, or can provide a more efficient amplifier design, reducing both the launched signal power and the pump power required by the amplifier.

Figure 8:
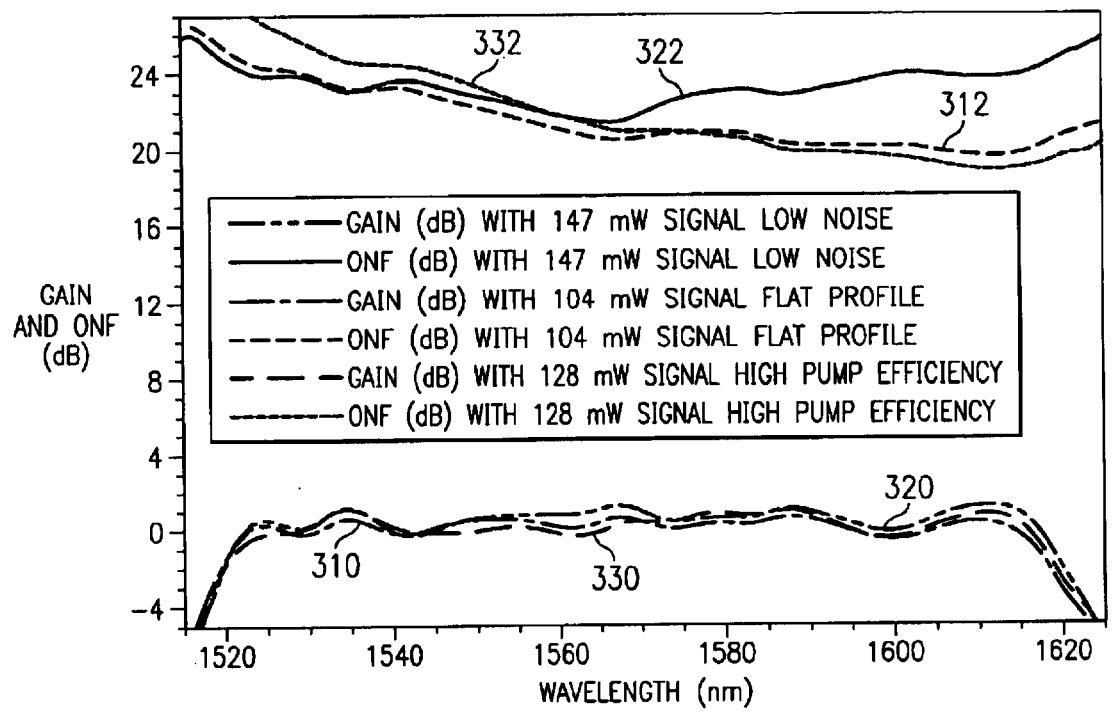
FIG. 8 is a graph illustrating simulated results of one particular amplifier design implementing various combinations of gain profiles.

FIG. 8 is a graph illustrating simulated results of one particular amplifier design implementing various combinations of gain profiles. This example assumes a two stage Raman amplifier comprising a distributed Raman amplification stage followed by a discrete Raman amplification stage. The distributed Raman amplification stage implements approximately eighty kilometers of SMF-28 fiber, while the discrete Raman amplification stage implements a length of DK-80 dispersion compensating fiber.

In all cases, the launched signal power of each wavelength signal is varied depending on the noise figure of the amplifier to achieve an SNR equivalent to a system with one milli-watt per channel of signal power and a flat noise figure of 25.6 decibels (approximately 33.2 decibels with a 5 gigahertz detection bandwidth at 1520 nanometers). The varied launched signal power is applied to the amplifier in three configurations. The first configuration is one where the gain profiles of the amplification stages are approximately flat. This will be referred to as the "flat profile configuration."

A second configuration implements approximately complementary gain profiles in the first and second amplification stages, similar to those shown in FIG. 4b. This will be referred to as the "low noise configuration."

A third configuration implements approximately complementary gain profiles in the first and second amplification stages similar to those shown in FIG. 5b. This will be referred to as the "high pump efficiency configuration."

Table 3 below shows the pump wavelengths and powers applied in each amplification stage.

TABLE 3

| LOW NOISE Applying 147 mW Total Signal Power Varying By Wavelength | | FLAT PROFILE Applying 104 mW Total Signal Power Varying By Wavelength | | HIGH PUMP EFF. Applying 128 mW Total Signal Power Varying By Wavelength | |
| --- | --- | --- | --- | --- | --- |
| Pump λ | Power | Pump λ | Power | Pump λ | Power |
| 80 km SMF-28 | | 80 km SMF-28 | | 80 km SMF-28 | |
| 1396 nm | .56 | 1396 nm | .56 | 1396 nm | .56 |
| 1416 nm | .56 | 1416 nm | .56 | 1427 nm | .56 |
| 1427 nm | .56 | 1427 nm | .56 | 1455 nm | .25 |
| 1455 nm | .2 | 1455 nm | .25 | 1472 nm | .15 |

TABLE 3-continued

| LOW NOISE Applying 147 mW Total Signal Power Varying By Wavelength | | FLAT PROFILE Applying 104 mW Total Signal Power Varying By Wavelength | | HIGH PUMP EFF. Applying 128 mW Total Signal Power Varying By Wavelength | |
|---|---|---|---|---|---|
| Pump λ | Power | Pump λ | Power | Pump λ | Power |
| 1472 nm | .08 | 1472 nm | .1 | 1505 nm | .25 |
| 1505 nm | .023 | 1505 nm | .085 | | |
| DK-80 | | DK-80 | | DK-80 | |
| 1405 nm | .56 | 1405 nm | .47 | 1396 nm | .56 |
| 1418 nm | .56 | 1418 nm | .53 | 1416 nm | .56 |
| 1445 nm | .4 | 1445 nm | .31 | 1427 nm | .22 |
| 1476 nm | .16 | 1476 nm | .085 | 1445 nm | .22 |
| 1509.5 nm | .063 | 1509.5 nm | .025 | 1476 nm | .04 |
| Total | 3.726 W | Total | 3.535 W | 1509.5 nm | .0107 |
| Pump Power: | | Pump Power: | | Total Pump Power: | 3.3807 W |

Line 310 represents the gain curve for the flat profile configuration, while line 312 represents the noise figure for the flat profile configuration. Line 320 represents the gain curve for the low noise configuration, while line 322 represents the noise figure for that configuration. Line 330 represents the gain curve for the high pump efficiency configuration, while line 332 represents the noise figure for that configuration.

As can be appreciated from FIG. 8, the low noise configuration enjoys the lowest peak noise figure. This is due at least in part to the complementary gain profiles used, which provides higher amplification to the wavelength signals closest in wavelength to the pump wavelengths, thus overcoming phonon induced noise. The low noise configuration, however in this example, utilizes the most total pump power and the most total launched signal power.

The flat profile configuration experiences a slightly higher peak noise figure, but enjoys the lowest average noise figure. In addition, the flat profile configuration utilizes less pump power than the low noise configuration and uses the least launched signal power of any of these examples. The reduced launched signal power reduces the signal-signal interactions, which results in a lower average noise figure for the amplifier. Moreover, the noise figure, and thus signal power, being highest at shorter wavelengths and lowest at longer wavelengths also results in a lower average noise figure.

The high pump efficiency configuration utilizes slightly more launched signal power than the flat profile configuration, but uses the least total pump power of all of the examples. Decreased pump power facilitates use of lower powered, less expensive pumps, or fewer pumps.

In any case, all of these designs can result in a substantially flat overall gain curve for the amplifier across a bandwidth of over eighty nanometers, in some embodiments over 100 nanometers. At the same time, the noise figure associated with the amplifier either is maintained at an acceptable level for all wavelengths, or is not a problem because launched signal powers are selected to provide a desired SNR given the noise figure at each wavelength. This results in effective system performance, while minimizing the required signal launch power.

Figure 9:
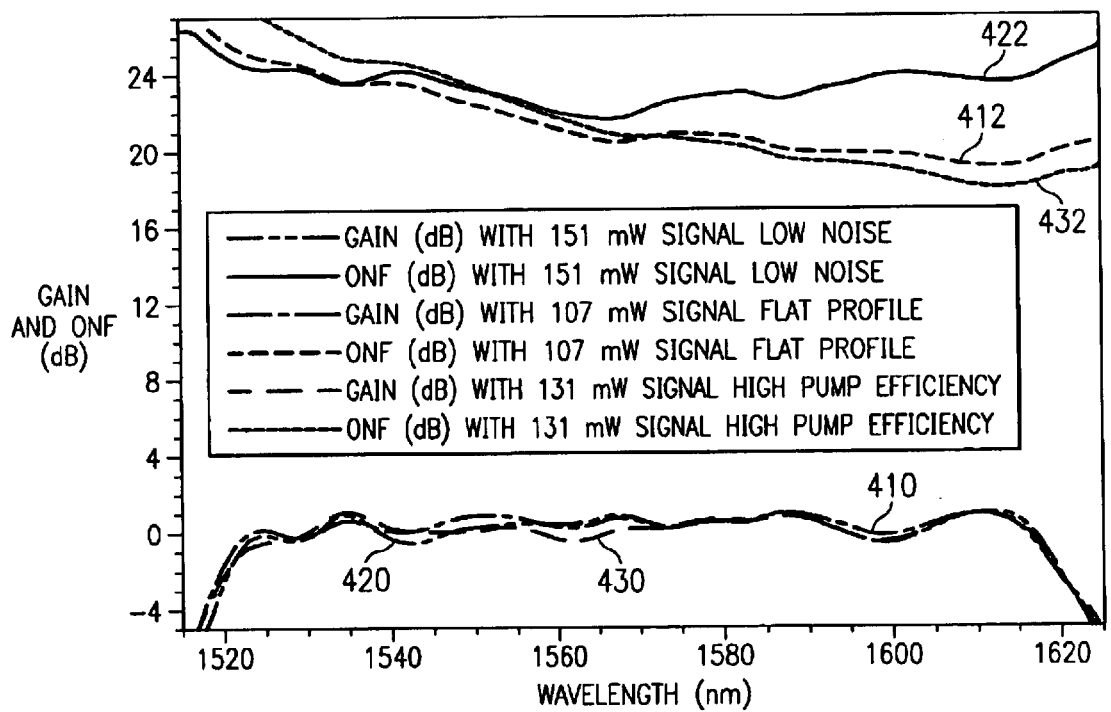
FIG. 9 is a graph illustrating simulated results of another amplifier design implementing various combinations of gain profiles.

FIG. 9 is a graph illustrating simulated results of a similar amplifier design as that shown in FIG. 8. This example assumes a two stage Raman amplifier comprising a distributed Raman amplification stage followed by a discrete Raman amplification stage. The distributed Raman amplification stage implements approximately eighty kilometers of non-zero dispersion shifted fiber (NZDSF), while the discrete Raman amplification stage implements a length of DK-80 dispersion compensating fiber. Table 4 shows pump powers used in the example from FIG. 9:

TABLE 4

| LOW NOISE Applying 151 mW Total Signal Power Varying By Wavelength | | FLAT PROFILE Applying 107 mW Total Signal Power Varying By Wavelength | | HIGH PUMP EFF. Applying 131 mW Total Signal Power Varying By Wavelength | |
|---|---|---|---|---|---|
| Pump λ | Power | Pump λ | Power | Pump λ | Power |
| 80 km NZDSF | | 80 km NZDSF | | 80 km NZDSF | |
| 1396 nm | .38 | 1396 nm | .343 | 1396 nm | .343 |
| 1416 nm | .38 | 1416 nm | .343 | 1427 nm | .343 |
| 1427 nm | .35 | 1427 nm | .343 | 1455 nm | .153 |
| 1455 nm | .1 | 1455 nm | .153 | 1472 nm | .092 |
| 1472 nm | .05 | 1472 nm | .0612 | 1505 nm | .153 |
| 1505 nm | .0085 | 1505 nm | .052 | | |
| DK-80 | | DK-80 | | DK-80 | |
| 1405 nm | .38 | 1405 nm | .47 | 1396 nm | .56 |
| 1418 nm | .45 | 1418 nm | .55 | 1416 nm | .56 |
| 1445 nm | .53 | 1445 nm | .33 | 1427 nm | .20 |
| 1476 nm | .2 | 1476 nm | .083 | 1445 nm | .23 |
| 1509.5 nm | .09 | 1509.5 nm | .023 | 1476 nm | .035 |
| Total | 2.9185 W | Total | 2.7512 W | 1509.5 nm | .0107 |
| Pump Power: | | Pump Power: | | Total Pump Power: | 2.6785 W |

Figure 10:
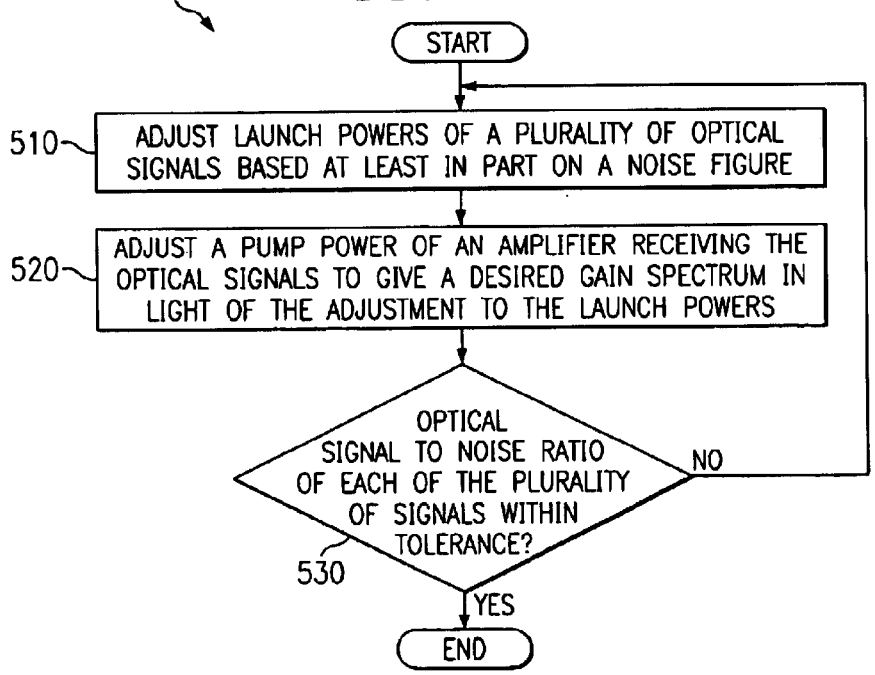
FIG. 10 is a flow chart illustrating one example of a method of determining a launch power for a wavelength signal in a multiple span communication system.

FIG. 10 is a flow chart illustrating one example of a method 500 of determining a launch power for a wavelength signal in a multiple span communication system. For ease of description, method 500 will be described with reference to communication system 10 shown in FIG. 1. Method 500 could, however, apply to other optical communication systems, subsystems, or amplifiers.

The noise figure of an amplifier is affected by the power of the signals input to the amplifier and by the power of the pump signals supplied by the amplifier. Changing the launch power of input signals with reference to the noise figure can, therefore, change the noise figure making it desirable to further change the launch power of the input signals and/or pump signals.

With this in mind, method 500 begins at step 510 by adjusting the launch power of at least some of the signals 15 as a function of the noise figure of at least a portion of optical link 25. This could involve, for example, adjusting the launch power of some or all of signals 15 according to the following equation:

$$P_s = SNR_{out} + 10\log(BW/1\ Hz) - 154.01 + NF - 10\log(\lambda/1\ micron)$$

where $P_s$ is the launch power, $SNR_{out}$ is the desired signal to noise ratio, BW is the detection bandwidth corresponding to each signal 15 being communicated, NF is the noise figure, and is the wavelength of the signal being adjusted. Although this example discusses adjusting launch powers with respect to only one desired signal to noise ratio, signals 15 could, alternatively, be grouped and have launch powers for each group determined with respect to a different signal to noise ratio.

The adjustment to the launched signal power can be accomplished, for example, by adjusting drive current(s) supplying transmitters that generate signals 15. Alternatively, a variable attenuator can be used to selectively attenuate signals 15 generated at a common launch signal power.

Step 510 may be performed, for example, on an initial system setup, or could be performed throughout operation of system 10 to maintain the SNR despite changes to system characteristics. In one embodiment, step 510 is performed manually. In other embodiments, step 510 can be performed automatically by or with the assistance of link manager 35.

Changes to the launch power spectrum can affect the gain profile of amplifiers in link 25. System 10 adjusts pump powers to at least some amplifiers in link 25 at step 520 to retain a desired gain profile in light of the changes to the launch power spectrum. This can be done, for example, by adjusting drive currents to pump sources, or by adjusting variable attenuators coupled to pump sources.

System 10 determines at step 530 whether variations in the signal to noise ratio for the plurality of signals 15 are within an acceptable tolerance. For example, it may be desired to have the signal to noise ratio for each signal vary by no more than 2.5 decibels. Or, it may be desired to have the signal to noise ratio remain completely flat (e.g., within 0.1 decibels or less) over each of the plurality of signals 15.

If system 10 determines at step 530 that the signal to noise ratio of the signals of interest varies by more than a particular tolerance, system 10 returns to steps 510 and 520, adjusting the launch powers of at least some of signals 15 based at least in part on a noise figure associated with link 25 and adjusting pump powers to retain a desired gain profile. This process continues until variations in the signal to noise ratio for the signals 15 of interest are within a desired tolerance.

System 10 may repeat this procedure periodically, on a random basis, or on demand to ensure that variations in the signal to noise ratio remain within the desired tolerance even despite changes in system characteristics, which can change, for example, with the temperature and/or age of components and the number of signals 15 being processed.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An optical amplifier comprising:
   a gain medium operable to receive a plurality of signals and one or more pump signals, and to facilitate amplification of at least some of the plurality of signals, each of the plurality of signals comprising a center wavelength; and
   a noise property associated with at least a portion of the amplifier and varying as a function of wavelength;
   wherein at least two of the plurality of signals comprise launch powers that are a function of a magnitude of the noise property measured at or near the center wavelength of that signal; and
   wherein launch powers of the plurality of signals primarily decrease with increasing center wavelengths of the plurality of signals.

2. The optical amplifier of claim 1, wherein each of the plurality of signals comprises a different center wavelength.

3. The optical amplifier of claim 1, wherein the gain medium is selected from the group consisting of a distributed Raman gain medium, a discrete Raman gain medium, and a rare earth doped gain medium.

4. The optical amplifier of claim 1, wherein the noise property comprises a noise figure for the entire amplifier.

5. The optical amplifier of claim 1, wherein the noise property comprises a noise figure for one stage of the amplifier.

6. The optical amplifier of claim 5, wherein the launch power of each of the at least two of the plurality of signals is determined as a function of a center wavelength of that signal and a noise figure of the amplifier stage measured at or near the center wavelength of that signal.

7. The optical amplifier of claim 1, wherein each of the at least two of the plurality of signals provides an approximately equal signal to noise ratio at an output from the portion of the amplifier associated with the noise property.

8. The optical amplifier of claim 1, wherein the launch power of a majority of the plurality of signals comprises at least one decibel less than the launch power of the signal associated with the highest noise figure.

9. The optical amplifier of claim 1, wherein the launch power of a majority of the plurality of signals comprises at least two decibels less than the launch power of the signal associated with the highest noise figure.

10. The optical amplifier of claim 1, wherein the at least two of the plurality of signals each comprise a launch power that is a function of a magnitude of the noise property measured within one nanometer of the center wavelength of that signal.

11. The optical amplifier of claim 1, wherein the at least two of the plurality of signals each comprise a launch power that is proportional to a noise figure of the amplifier at or near the center wavelength of that signal.

12. The optical amplifier of claim 1, wherein the at least two of the plurality of signals each comprise a launch power that approximately follows a noise figure of the amplifier as a function of wavelength.

13. The optical amplifier of claim 1, wherein each of the plurality of signals comprises a launch power that that approximately follows a noise figure of the amplifier as a function of wavelength.

14. The optical amplifier of claim 1, wherein the at least two of the plurality of signals each comprise a launch power that is inversely proportional to a signal to noise ratio at or near the center wavelength of that signal that would arise if all of the plurality of signals comprised the same launch power.

15. The optical amplifier of claim 1, wherein the amplifier comprises a multiple stage amplifier, comprising:
   a first amplifier stage operable to amplify the plurality of signals;
   a second amplifier stage operable to amplify at least some of the plurality of signals after those signals have been amplified by the first stage;
   wherein the first and second amplifier stages each comprise an approximately flat gain profile.

16. The optical amplifier of claim 1, wherein the amplifier comprises a multiple stage amplifier, comprising:
   a first amplifier stage having a first sloped gain profile operable to amplify the plurality of signals;
   a second amplifier stage having a second sloped gain profile operable to amplify at least some of the plurality of signals after those signals have been amplified by the first stage, the second sloped gain profile being approximately complementary to the first sloped gain profile.

17. The optical amplifier of claim 16, wherein the combined effect of the first and second amplifier stages contributes to an approximately flat overall gain profile over the plurality of signal wavelengths.

18. The optical amplifier of claim 16, wherein the slope of the first gain profile has an approximately equal and opposite slope from the slope of the second gain profile.

19. The optical amplifier of claim 16, wherein the first and second gain profiles each comprise a plurality of slopes.

20. The optical amplifier of claim 16, wherein:
   the first sloped gain profile comprises a gain profile wherein a majority of shorter signal wavelengths are amplified more than a majority of longer signal wavelengths; and
   the second sloped gain profile comprises a gain profile wherein a majority of the longer signal wavelengths are amplified more than a majority of the shorter signal wavelengths.

21. The optical amplifier of claim 20, wherein a phonon stimulated noise figure of the amplifier comprises less than four decibels.

22. The optical amplifier of claim 20, wherein a noise figure of the amplifier in the small signal limit comprises less than eight decibels over a bandwidth of at least forty (40) nanometers.

23. The optical amplifier of claim 20, wherein a noise figure of the amplifier in the small signal limit comprises less than seven decibels over a bandwidth of at least forty (40) nanometers.

24. The optical amplifier of claim 20, further comprising a third amplifier stage having a third sloped gain profile comprising a gain profile wherein a majority of shorter signal wavelengths are amplified more than a majority of longer signal wavelengths.

25. The optical amplifier of claim 24, wherein the combined effect of the first, second, and third, amplification stages contributes to an approximately flat overall gain profile over the plurality of signal wavelengths.

26. The optical amplifier of claim 24, wherein the second amplifier stage comprises a Raman amplification stage.

27. The optical amplifier of claim 20, further comprising:
   a third amplifier stage having a third sloped gain profile wherein a majority of longer signal wavelengths are amplified more than a majority of shorter signal wavelengths; and
   a fourth amplifier stage having a fourth sloped gain profile wherein a majority of shorter signal wavelengths are amplified more than a majority of longer signal wavelengths.

28. The optical amplifier of claim 27, wherein the combined effect of the first, second, third, and fourth amplifier stages contributes to an approximately flat overall gain profile over the plurality of signal wavelengths.

29. The optical amplifier of claim 28, wherein:
   the combined effect of the first and second amplifier stages contributes to an approximately flat overall gain profile over the plurality of signal wavelengths output from the second stage; and
   wherein the combined effect of the third and fourth amplifier stages contributes to an approximately flat overall gain profile over the plurality of signal wavelengths output from the fourth stage.

30. The optical amplifier of claim 16, wherein:
   the first sloped gain profile comprises a gain profile wherein a majority of longer signal wavelengths are amplified more than a majority of shorter signal wavelengths; and
   the second sloped gain profile comprises a gain profile wherein a majority of the shorter signal wavelengths are amplified more than a majority of the longer signal wavelengths.

31. The optical amplifier of claim 30, wherein the first amplifier stage comprises a Raman amplification stage and wherein the first Raman stage is coupled to the second amplifier stage so as to allow longer wavelength pump signals in the first Raman stage to accept power from shorter wavelength pump signals in the second amplifier stage.

32. The optical amplifier of claim 31, wherein the second amplifier stage comprises an amplifier stage selected from a group consisting of a Raman amplifier and a rare earth doped amplifier.

33. The optical amplifier of claim 16, wherein each of the amplifier stages comprises a plurality of pump signals collectively operable to affect the slope and magnitude of the gain profile for that stage.

34. The optical amplifier of claim 33, wherein the pump signal comprising the longest center wavelength comprises a center wavelength at least ten nanometers shorter than the shortest center wavelength of the plurality of signals.

35. The optical amplifier of claim 33, wherein a majority of the gain applied to the signals having center wavelengths within thirty nanometers of the longest center wavelength pump signal is applied in the first stage of the amplifier.

36. The optical amplifier of claim 33, wherein a majority of the gain supplied by the longest center wavelength pump signal is applied in a last stage of the amplifier.

37. The optical amplifier of claim 16, further comprising at least one additional amplification stage coupled between the first and second Raman amplification stages.

38. The optical amplifier of claim 1, wherein the bandwidth of the plurality of signals comprises more than forty nanometers.

39. The optical amplifier of claim 1, wherein the bandwidth of the plurality of signals comprises more than eighty nanometers.

40. The optical amplifier of claim 1, wherein an overall gain profile of the amplifier prior to use of a gain flattening filter varies by less than five decibels over at least a majority of the plurality of signal wavelengths.

41. An optical amplifier comprising:
an input operable to receive a plurality of signals each comprising a center wavelength, wherein at least two of the plurality of signals comprise different launch powers;
a pump operable to generate a pump signal; and
a gain medium operable to receive the plurality of signals and the pump signal and to facilitate amplification of at least some of the plurality of signals;
wherein a signal to noise ratio measured at an output of the amplifier varies by no more than 2.5 decibels over a bandwidth of at least 40 nanometers for at least a majority of signals output from the amplifier; and
wherein launch powers of the plurality of signals primarily decrease with increasing center wavelengths of the plurality of signals.

42. The optical amplifier of claim 41, wherein the gain medium is selected from the group consisting of a distributed Raman gain medium, a discrete Raman gain medium, and a rare earth doped gain medium.

43. The optical amplifier of claim 41, wherein the launch power of each of the at least two of the plurality of signals is determined as a function of a center wavelength of that signal and a noise figure of at least a portion of the amplifier measured at or near the center wavelength of that signal.

44. The optical amplifier of claim 41, wherein the amplifier comprises a multiple stage amplifier, comprising:
a first amplifier stage operable to amplify the plurality of signals;
a second amplifier stage operable to amplify at least some of the plurality of signals after those signals have been amplified by the first stage;
wherein the first and second amplifier stages each comprise an approximately flat gain profile.

45. The optical amplifier of claim 41, wherein the amplifier comprises a multiple stage amplifier, comprising:
a first amplifier stage having a first sloped gain profile operable to amplify the plurality of signals;
a second amplifier stage having a second sloped gain profile operable to amplify at least some of the plurality of signals after those signals have been amplified by the first stage, the second sloped gain profile being approximately complementary to the first sloped gain profile.

46. The optical amplifier of claim 45, wherein the combined effect of the first and second amplifier stages contributes to an approximately flat overall gain profile over the plurality of signal wavelengths.

47. The optical amplifier of claim 45, wherein:
the first sloped gain profile comprises a gain profile wherein a majority of shorter signal wavelengths are amplified more than a majority of longer signal wavelengths; and
the second sloped gain profile comprises a gain profile wherein a majority of the longer signal wavelengths are amplified more than a majority of the shorter signal wavelengths.

48. The optical amplifier of claim 47, further comprising a third amplifier stage having a third sloped gain profile comprising a gain profile wherein a majority of shorter signal wavelengths are amplified more than a majority of longer signal wavelengths.

49. The optical amplifier of claim 48, wherein the second amplifier stage comprises a Raman amplification stage.

50. The optical amplifier of claim 47, further comprising:
a third amplifier stage having a third sloped gain profile wherein a majority of longer signal wavelengths are amplified more than a majority of shorter signal wavelengths; and
a fourth amplifier stage having a fourth sloped gain profile wherein a majority of shorter signal wavelengths are amplified more than a majority of longer signal wavelengths.

51. The optical amplifier of claim 50, wherein:
the combined effect of the first and second amplifier stages contributes to an approximately flat overall gain profile over the plurality of signal wavelengths output from the second stage; and
wherein the combined effect of the third and fourth amplifier stages contributes to an approximately flat overall gain profile over the plurality of signal wavelengths output from the fourth stage.

52. The optical amplifier of claim 45, wherein:
the first sloped gain profile comprises a gain profile wherein a majority of longer signal wavelengths are amplified more than a majority of shorter signal wavelengths; and
the second sloped gain profile comprises a gain profile wherein a majority of the shorter signal wavelengths are amplified more than a majority of the longer signal wavelengths.

53. The optical amplifier of claim 52, wherein the first amplifier stage comprises a Raman amplification stage and wherein the first Raman stage is coupled to the second amplifier stage so as to allow longer wavelength pump signals in the first Raman stage to accept power from shorter wavelength pump signals in the second amplifier stage.

54. The optical amplifier of claim 45, further comprising at least one additional amplification stage coupled between the first and second Raman amplification stages.

55. The optical amplifier of claim 41, wherein the bandwidth of the plurality of signal wavelengths comprises at least sixty nanometers.

56. The optical amplifier of claim 41, wherein the bandwidth of the plurality of signal wavelengths comprises at least eighty nanometers.

57. The optical amplifier of claim 41, wherein the overall gain profile of the amplifier prior to use of a gain flattening filter varies by less than five decibels over at least a majority of the plurality of signal wavelengths.

58. The optical amplifier of claim 41, wherein the signal to noise ratio varies by no more than one decibel for at least a majority of signals output from the amplifier.

59. The optical amplifier of claim 41, wherein the signal to noise ratio varies by no more than 0.1 decibels for at least a majority of signals output from the amplifier.

60. An optical communication system comprising:
an input terminal comprising a plurality of optical transmitters each operable to output one of a plurality of signals each comprising a center wavelength;
a plurality of spans of optical medium coupled to the input terminal and operable to facilitate communication of the plurality of signals; and
a plurality of in-line amplifiers each coupled to at least one of the plurality of spans of optical medium and each operable to receive one or more pump signals;
wherein at least two of the plurality of signals comprise launch powers that are a function of a noise property associated with at least a portion of the system; and wherein launch powers of the plurality of signals launched from the plurality of optical transmitters primarily decrease with increasing center wavelengths of the plurality of signals.

61. The optical communication system of claim 60, wherein the plurality of transmitters comprises a plurality of pairs of optical sources and modulators.

62. The optical communication system of claim 60, wherein each of the plurality of transmitters comprises a modulator operable to receive from a common optical source an unmodulated signal having a center wavelength and to modulate the received signal.

63. The optical communication system of claim 62, wherein the common optical source comprises:
a modelocked pulse source operable to generate a plurality of optical pulses;
a continuum generator operable to broaden the spectrum of the plurality of optical pulses into an approximate spectral continuum of optical pulses; and
a signal splitter operable to generate from the approximate continuum a plurality of unmodulated signals each comprising a center wavelength.

64. The optical communication system of claim 60, wherein at least one of the plurality of in-line amplifiers comprises a distributed Raman amplification stage.

65. The optical communication system of claim 60, wherein at least one of the plurality of in-line amplifiers comprises a discrete Raman amplification stage.

66. The optical communication system of claim 60, wherein at least one of the plurality of in-line amplifiers comprises a rare earth doped amplification stage.

67. The optical communication system of claim 60, wherein the launch power of each of the at least two of the plurality of signals is determined as a function of a center wavelength of that signal and a noise figure of the amplifier stage measured at or near the center wavelength of that signal.

68. The optical communication system of claim 60, wherein at least one of the in-line amplifiers comprises a multiple stage amplifier, comprising:
a first amplifier stage operable to amplify the plurality of signals;
a second amplifier stage operable to amplify at least two of the plurality of signals after those signals have been amplified by the first stage;
wherein the first and second amplifier stages each comprise an approximately flat gain profile.

69. The optical communication system of claim 60, wherein at least one of the in-line amplifiers comprises a multiple stage amplifier, comprising:
a first amplifier stage having a first sloped gain profile operable to amplify the plurality of signals;
a second amplifier stage having a second sloped gain profile operable to amplify at least two of the plurality of signals after those signals have been amplified by the first stage, the second sloped gain profile being approximately complementary to the first sloped gain profile.

70. The optical communication system of claim 69, wherein the first sloped gain profile comprises a gain profile wherein a majority of shorter signal wavelengths are amplified more than a majority of longer signal wavelengths; and
the second sloped gain profile comprises a gain profile wherein a majority of the longer signal wavelengths are amplified more than a majority of the shorter signal wavelengths.

71. The optical communication system of claim 70, further comprising a third amplifier stage having a third sloped gain profile comprising a gain profile wherein a majority of shorter signal wavelengths are amplified more than a majority of longer signal wavelengths.

72. The optical communication system of claim 70, further comprising:
a third amplifier stage having a third sloped gain profile wherein a majority of longer signal wavelengths are amplified more than a majority of shorter signal wavelengths; and
a fourth amplifier stage having a fourth sloped gain profile wherein a majority of shorter signal wavelengths are amplified more than a majority of longer signal wavelengths.

73. The optical communication system of claim 69, wherein:
the first sloped gain profile comprises a gain profile wherein a majority of longer signal wavelengths are amplified more than a majority of shorter signal wavelengths; and
the second sloped gain profile comprises a gain profile wherein a majority of the shorter signal wavelengths are amplified more than a majority of the longer signal wavelengths.

74. The optical communication system of claim 73, wherein the first amplifier stage comprises a Raman amplification stage and wherein the first Raman stage is coupled to the second amplifier stage so as to allow longer wavelength pump signals in the first Raman stage to accept power from shorter wavelength pump signals in the second amplifier stage.

75. The optical communication system of claim 60, wherein the bandwidth of the plurality of signal wavelengths comprises at least forty nanometers.

76. The optical communication system of claim 60, wherein the bandwidth of the plurality of signal wavelengths comprises at least eighty nanometers.

77. The optical communication system of claim 60, wherein the overall gain profile of the amplifier prior to use of a gain flattening filter varies by less than five decibels over at least a majority of the plurality of signal wavelengths.

78. The optical communication system of claim 60, further comprising a management element operable to determine launch powers for the at least two of the plurality of signals based at least in part on a noise figure associated with at least a portion of the system.

79. The optical communication of claim 60, further comprising a signal combiner operable to combine the plurality of signals into a multiple wavelength signal prior to communication to the plurality of spans of optical medium.

80. The optical communication system of claim 60, further comprising a signal separator operable to separate the signals from the multiple wavelength signal received from one of the plurality of spans.

81. The optical communication system of claim 60, further comprising a lossy element coupled to one of the plurality of spans, wherein the lossy element comprises an element selected from a group consisting of an isolator, a gain equalizer, an add/drop multiplexer, and a cross connect.

82. The optical communication system of claim 60, wherein the plurality of signals comprises:
a first group of optical signals having launch powers determined with reference to the noise figure to result in a first signal to noise ratio; and a second group of optical signals having launch powers determined with reference to the noise figure to result in a second signal to noise ratio different than the first signal to noise ratio.

83. A method of communicating signals, comprising:

communicating a plurality of signals each having a center wavelength to an optical link comprising a plurality of spans of fiber; and amplifying the plurality of signals to at least partially compensate for losses in one or more of the plurality of spans of fiber, wherein the plurality of signals are amplified in a gain medium operable to receive the plurality of signals and one or more pump signals;

wherein signals output from the optical link experience a noise property varying as a function of wavelength, and wherein at least two of the signals input to the optical link comprise launch powers that are a function of the noise property measured at or near the center wavelength of that signal; and wherein launch powers of the plurality of signals primarily decrease with increasing center wavelengths of the plurality of signals.

84. The method of claim 83, wherein communicating a plurality of signals comprises generating each of the plurality of signals using a separate optical source.

85. The method of claim 83, wherein communicating a plurality of signals comprises:

generating a plurality of unmodulated signals using a common optical source; and modulating each of the unmodulated signals using a separate modulator.

86. The method of claim 83, wherein the optical link comprises at least one discrete Raman amplification stage.

87. The method of claim 83, wherein the optical link comprises at least one distributed Raman amplification stage.

88. The method of claim 83, wherein the optical link comprises at least one rare earth doped amplification stage.

89. The method of claim 83, wherein amplifying the plurality of signals comprises amplifying the plurality of signals with at least one multiple-stage amplifier having an approximately flat gain profile in each amplifier stage.

90. The method of claim 83, wherein amplifying the plurality of signals comprises:

applying a first sloped gain profile to a plurality of signals at a first stage of an amplifier in the optical link;

applying a second sloped gain profile to two of the plurality of signals at a second stage of the amplifier, the second sloped gain profile comprising an approximately complementary gain profile of the first sloped gain profile.

91. The method of claim 90, wherein the combined effect of the first and second sloped gain profiles contributes to an approximately flat overall gain profile over the plurality of signal wavelengths.

92. The method of claim 90, wherein:

the first sloped gain profile comprises a gain profile wherein a majority of shorter signal wavelengths are amplified more than a majority of longer signal wavelengths; and the second sloped gain profile comprises a gain profile wherein a majority of the longer signal wavelengths are amplified more than a majority of the shorter signal wavelengths.

93. The method of claim 90, wherein:

the first sloped gain profile comprises a gain profile wherein a majority of longer signal wavelengths are amplified more than a majority of shorter signal wavelengths; and the second sloped gain profile comprises a gain profile wherein a majority of the shorter signal wavelengths are amplified more than a majority of the longer signal wavelengths.

94. The method of claim 83, wherein the signals output from the optical link comprise signals output from an access element coupled to the optical link.

95. The method of claim 83, wherein the signals output from the optical link comprise signals output to a receiver at an end of the optical link.

96. The method of claim 83, wherein the launch power of the at least two of the signals input to the optical link comprise a function of the center wavelength of the signal and a noise figure measured at or near the signal's center wavelength.

97. The method of claim 83, wherein the at least two of the plurality of signals each comprise a launch power that is a function of a magnitude of a noise figure measured within one nanometer of the center wavelength of that signal.

98. The method of claim 83, wherein the at least two of the plurality of signals each comprise a launch power that is proportional to a noise figure of the amplifier at or near the center wavelength of that signal.

99. The method of claim 83, wherein the at least two of the plurality of signals each comprise a launch power that approximately follows a noise figure of the amplifier as a function of wavelength.

100. The method of claim 83, wherein each of the plurality of signals comprises a launch power that that approximately follows a noise figure of the amplifier as a function of wavelength.

101. The method of claim 83, wherein the at least two of the plurality of signals each comprise a launch power that is inversely proportional to a signal to noise ratio at or near the center wavelength of that signal that would arise if all of the plurality of signals comprised the same launch power.

102. The method of claim 83, wherein a signal to noise ratio associated with the plurality of signals measured at the output from the optical link varies by no more than 2.5 decibels for at least a majority of signals output from the optical link.

103. The method of claim 83, wherein a signal to noise ratio associated with the plurality of signals measured at the output from the optical link varies by no more than 1 decibel for at least a majority of signals output from the optical link.

104. The method of claim 83, wherein a signal to noise ratio associated with the plurality of signals measured at the output from the optical link varies by no more than 0.1 decibels for at least a majority of signals output from the optical link.

105. A method of communicating signals, comprising:

(a) adjusting launch powers of a plurality of signals input to an optical link based at least in part on a noise property associated with at least a portion of the optical link for at least a portion of the plurality of signals;

(b) adjusting a pump power of an amplifier in the optical link to give a desired gain spectrum in light of the adjusted launch powers; and (c) repeating steps (a) and (b) until a signal to noise ratio at an output from the optical link varies by no more than a threshold amount for at least a majority of signals output from the optical link;

wherein launch powers of the plurality of signals primarily decrease with increasing center wavelengths of the plurality of signals.

106. The method of claim 105, wherein adjusting the launch power of a plurality of signals comprises adjusting the launch power as a function of the center wavelength of the signal and a noise figure measured at or near the signal's center wavelength.

107. The method of claim 105, wherein the optical link comprises at least one discrete Raman amplification stage.

108. The method of claim 105, wherein the optical link comprises at least one distributed Raman amplification stage.

109. The method of claim 105, wherein the optical link comprises at least one rare earth doped amplification stage.

110. The method of claim 105, wherein the threshold level comprises 2.5 decibels for at least a majority of signals output from the optical link.

111. The method of claim 105 wherein the threshold level comprises 1 decibel for at least a majority of signals output from the optical link.

112. The method of claim 105, wherein the threshold level comprises 0.1 decibels for at least a majority of signals output from the optical link.

113. The method of claim 105, further comprising:
monitoring a noise property of at least a portion of the optical link during operation;
adjusting the launch powers of a plurality of signals input to the optical link based at least in part on the noise property monitored during operation.

114. The method of claim 113, wherein monitoring the noise property comprises determining the noise property on a periodic basis.

115. A method of communicating signals, comprising:
setting launch powers of a plurality of signals at one or more initial launch power levels;
setting a pump power of an amplifier in an optical link receiving the plurality of signals at an initial pump power level to give a desired gain spectrum at the output of the amplifier;
adjusting the launch powers of at least some of the plurality of signals based at least in part on a noise property associated with at least a portion of the optical link and at least some of the plurality of signals; and
adjusting the pump power of the amplifier to retain the desired gain spectrum in light of the adjustment to the launch powers;
wherein launch powers of the plurality of signals primarily decrease with increasing center wavelengths of the plurality of signals.

116. The method of claim 115, wherein adjusting the launch power of a plurality of signals comprises adjusting the launch power as a function of the center wavelength of the signal and the noise figure measured at or near the signal's center wavelength.

117. The method of claim 115, wherein the optical link comprises at least one discrete Raman amplification stage.

118. The method of claim 115, wherein the optical link comprises at least one distributed Raman amplification stage.

119. The method of claim 115, wherein the optical link comprises at least one rare earth doped amplification stage.

120. The method of claim 115, wherein the launch powers are adjusted to ensure a signal to noise ratio for each of the plurality of signals measured at an output from the optical link that varies by no more than 2.5 decibels for at least a majority of signals output from the optical link.

121. The method of claim 115, wherein the launch powers are adjusted to ensure a signal to noise ratio for each of the plurality of signals measured at an output from the optical link that varies by no more than 1 decibel for at least a majority of signals output from the optical link.

122. The method of claim 115, wherein the launch powers are adjusted to ensure a signal to noise ratio for each of the plurality of signals measured at an output from the optical link that varies by no more than 0.1 decibels for at least a majority of signals output from the optical link.

123. The optical amplifier of claim 1, wherein the plurality of signals comprise a median wavelength wherein a shorter plurality of wavelengths have shorter wavelengths than the median wavelength and a longer plurality of wavelengths have longer wavelengths than the median wavelength; and
wherein the primarily decreasing launch powers of the plurality of signals result in an aggregate power of the shorter plurality of wavelengths being larger than the aggregate power of the longer plurality of wavelengths.

124. An optical amplifier comprising:
a gain medium operable to receive a plurality of signals and one or more pump signals, each of the plurality of signals comprising a center wavelength, at least some of the plurality of signals associated with a first signal to noise ratio measured at an output coupled to the gain medium;
wherein at least two of the plurality of signals comprise launch powers that are a function of a magnitude of a noise property measured at or near the center wavelength of that signal; and
wherein a sum of the launch powers of the plurality of signals comprises a lower total power than would result from all of the plurality of signals being launched at the same launch power sufficient for each of the plurality of signals to obtain at least the first signal to noise ratio at the output.

125. The optical amplifier of claim 124, wherein the noise property comprises a noise figure.

126. An optical communication system comprising:
an input terminal comprising a plurality of optical transmitters each operable to output one of a plurality of signals each comprising a center wavelength;
a plurality of spans of optical medium coupled to the input terminal and operable to facilitate communication of the plurality of signals, wherein at least some of the plurality of signals are associated with a first signal to noise ratio measured at an output from the optical medium; and
a plurality of in-line amplifiers each coupled to at least one of the plurality of spans of optical medium and each operable to receive a pump signal;
wherein at least two of the plurality of signals comprise launch powers that are a function of a noise property associated with at least a portion of the system; and
wherein a sum of the launch powers of the plurality of signals comprises a lower total power than would result from all of the plurality of signals being launched at the same launch power sufficient for each of the plurality of signals to obtain at least the first signal to noise ratio at the output from the optical medium.

127. The optical communication system of claim 126, wherein the noise property comprises a noise figure.

128. A method of communicating signals, comprising:
communicating to an optical link comprising a plurality of spans of fiber a plurality of signals each having a center wavelength, wherein at least some of the plurality of signals are associated with a first signal to noise ratio measured at an output from the optical link; and amplifying the plurality of signals to at least partially compensate for losses in one or more of the plurality of spans of fiber, wherein the plurality of signals are amplified in a gain medium operable to receive the plurality of signals and one or more pump signals;

wherein signals output from the optical link experience a noise property varying as a function of wavelength, and wherein at least two of the signals input to the optical link comprise launch powers that are a function of the noise property measured at or near the center wavelength of that signal; and wherein a sum of the launch powers of the plurality of signals comprises a lower total power than would result from all of the plurality of signals being launched at the same launch power sufficient for each of the plurality of signals to obtain at least the first signal to noise ratio at the output from the optical medium.

129. The method of claim 128, wherein the noise property comprises a signal to noise ratio.

130. A method of communicating signals, comprising:
(a) adjusting launch powers of a plurality of signals input to an optical link based at least in part on a noise property associated with at least a portion of the optical link for at least a portion of the plurality of signals, wherein at least some of the plurality of signals are associated with a first signal to noise ratio measured at an output from the optical link;
(b) adjusting a pump power of an amplifier in the optical link to give a desired gain spectrum in light of the adjusted launch powers; and
(c) repeating steps (a) and (b) until a signal to noise ratio at an output from the optical link varies by no more than a threshold amount for at least a majority of signals output from the optical link;

wherein a sum of the launch powers of the plurality of signals comprises a lower total power than would result from all of the plurality of signals being launched at the same launch power sufficient for each of the plurality of signals to obtain at least the first signal to noise ratio at the output from the optical medium.

131. The method of claim 130, wherein the noise property comprises a noise figure.

132. A method of communicating signals, comprising:
setting launch powers of a plurality of signals at one or more initial launch power levels;

setting a pump power of an amplifier in an optical link receiving the plurality of signals at an initial pump power level to give a desired gain spectrum at the output of the amplifier;

adjusting the launch powers of at least some of the plurality of signals based at least in part on a noise property associated with at least a portion of the optical link and at least some of the plurality of signals; and adjusting the pump power of the amplifier to retain the desired gain spectrum in light of the adjustment to the launch powers;

wherein at least some of the plurality of signals launched at the one or more initial launch power levels are associated with a first signal to noise ratio measured at an output from the optical link; and wherein a sum of the launch powers of the plurality of signals comprises a lower total power than would result from all of the plurality of signals being launched at the same launch power sufficient for each of the plurality of signals to obtain at least the first signal to noise ratio at the output from the optical link.

133. The method of claim 132, wherein the noise property comprises a noise figure.

* * * * *